United States Patent
Goodman et al.

(10) Patent No.: US 9,074,420 B2
(45) Date of Patent: Jul. 7, 2015

(54) METHODS, APPARATUSES, AND SYSTEMS FOR RESISTING LATERAL DISPLACEMENT OF MOVABLE PARTITIONS

(75) Inventors: E. Carl Goodman, Bountiful, UT (US); Anthony Moss, Salt Lake City, UT (US)

(73) Assignee: Won-Door Corporation, Salt Lake City, UT (US)

( * ) Notice: Subject to any disclaimer, the term of this patent is extended or adjusted under 35 U.S.C. 154(b) by 391 days.

(21) Appl. No.: 13/324,849

(22) Filed: Dec. 13, 2011

(65) Prior Publication Data
US 2012/0305201 A1    Dec. 6, 2012

Related U.S. Application Data

(63) Continuation-in-part of application No. 13/149,520, filed on May 31, 2011.

(51) Int. Cl.
  *A47H 5/00*    (2006.01)
  *E06B 3/48*    (2006.01)
  (Continued)

(52) U.S. Cl.
  CPC ............ *E06B 3/94* (2013.01); *Y10T 29/49826* (2015.01); *E05D 15/0665* (2013.01); *E05D 15/26* (2013.01); *E05F 7/06* (2013.01); *E05D 2015/268* (2013.01); *E05D 15/063* (2013.01);
  (Continued)

(58) Field of Classification Search
  CPC ....... E06B 9/0653; E06B 9/0661; E06B 9/06; E06B 9/0669; E06B 9/0676; E06B 3/94; E05D 15/26
  USPC ........ 160/126, 127, 196.1, 203, 84.08, 84.11, 160/118, 199, 206, 113, 114
  See application file for complete search history.

(56) References Cited

U.S. PATENT DOCUMENTS 684,130 A    10/1901   Taubert
1,205,707 A  11/1916   Cahill
(Continued)

FOREIGN PATENT DOCUMENTS

DE    2506469 A1    8/1975
DE    2755157 A1    6/1979
(Continued)

OTHER PUBLICATIONS

PCT International Search Report and Written Opinion for PCT/US2008/050873 dated Oct. 7, 2008.
(Continued)

*Primary Examiner* — Katherine Mitchell
*Assistant Examiner* — Jeremy Ramsey
(74) *Attorney, Agent, or Firm* — TraskBritt

(57) ABSTRACT

Apparatuses, methods and systems for directionally controlling a movable partition are provided. In one embodiment, an apparatus for controlling lateral displacement of a movable partition includes a bracket, a roller assembly, a first attachment bracket, and a second attachment bracket. The roller assembly is coupled to the bracket and includes a roller element. The first attachment bracket attaches to a first panel of the movable partition and is configured for hinged coupling to a first side of the bracket such that a first hinge axis substantially coincides with a centerline of the first panel. The second attachment bracket attaches to a second panel of the movable partition and is configured hinged coupling to a second side of the bracket such that a second hinge axis substantially coincides with a centerline of the second panel.

31 Claims, 17 Drawing Sheets

(51) Int. Cl.
   *E06B 3/94*      (2006.01)
   *E06B 9/06*      (2006.01)
   *E05D 15/06*     (2006.01)
   *E05D 15/26*     (2006.01)
   *E05F 7/06*      (2006.01)
   *B60B 33/04*     (2006.01)
   *B60B 33/00*     (2006.01)

(52) U.S. Cl.
   CPC .......... *E05Y 2900/134* (2013.01); *B60B 33/045* (2013.01); *B60B 2200/20* (2013.01); *B60B 33/0005* (2013.01)

(56) References Cited

U.S. PATENT DOCUMENTS

| | | |
|---|---|---|
| 1,377,626 A | 5/1921 | Phillips |
| 1,448,845 A | 3/1923 | Johnson et al. |
| 1,463,347 A | 7/1923 | Walker |
| 1,595,668 A | 8/1926 | Kuhl |
| 1,595,669 A | 8/1926 | Kurner |
| 1,612,443 A | 12/1926 | Johnson et al. |
| 1,644,285 A | 10/1927 | Smith |
| 1,786,505 A | 12/1930 | Phillips |
| 1,833,496 A | 11/1931 | Phillips |
| 1,964,316 A | 6/1934 | Ellison |
| 2,027,992 A | 1/1936 | Maurer |
| 2,043,981 A | 6/1936 | Bickel |
| 2,151,033 A | 3/1939 | Jones |
| 2,736,373 A | 2/1956 | Truesdale |
| 2,915,115 A | 12/1959 | Reynolds |
| 3,039,554 A | 6/1962 | Hosking et al. |
| 3,082,817 A | 3/1963 | Merrill |
| 3,102,581 A | 9/1963 | Kochanowski |
| 3,133,589 A | 5/1964 | Harris |
| 3,223,147 A | 12/1965 | Holloway |
| 3,289,741 A | 12/1966 | Gossling |
| 3,295,257 A | 1/1967 | Douglass |
| 3,348,628 A * | 10/1967 | Dixon et al. .................. 181/287 |
| 3,389,741 A | 6/1968 | Bean |
| 3,447,584 A | 6/1969 | Smart |
| 3,453,790 A | 7/1969 | HHarris |
| 3,481,388 A | 12/1969 | Smart |
| 3,509,934 A | 5/1970 | Smart |
| 3,577,679 A | 5/1971 | Petterborg |
| 3,698,036 A | 10/1972 | Goodman |
| 3,720,254 A | 3/1973 | Smart |
| 3,850,223 A | 11/1974 | Tompkins |
| 3,910,338 A | 10/1975 | Pontoppidan |
| 3,972,381 A | 8/1976 | Gail |
| 3,979,861 A | 9/1976 | Fromme et al. |
| 4,014,072 A | 3/1977 | Schumacher |
| 4,133,364 A | 1/1979 | Smart |
| 4,154,280 A | 5/1979 | Hashimoto |
| 4,172,423 A | 10/1979 | Monne |
| 4,408,369 A | 10/1983 | Labelle |
| 4,658,878 A | 4/1987 | Williams |
| 4,763,712 A * | 8/1988 | van der Klaauw ......... 160/84.08 |
| 4,834,161 A | 5/1989 | Johnson et al. |
| 4,852,628 A | 8/1989 | Klein |
| 4,867,221 A * | 9/1989 | Dixon et al. ............... 160/84.08 |
| 4,887,659 A | 12/1989 | West |
| 4,922,987 A | 5/1990 | Marontate et al. |
| 4,924,929 A | 5/1990 | Johnson et al. |
| 4,932,455 A | 6/1990 | Yamada |
| 4,957,600 A | 9/1990 | Carlson et al. |
| 5,025,846 A | 6/1991 | West |
| 5,065,807 A | 11/1991 | Maeda et al. |
| 5,143,137 A | 9/1992 | West |
| 5,287,908 A | 2/1994 | Hoffmann et al. |
| 5,295,527 A | 3/1994 | West |
| 5,373,887 A | 12/1994 | Glover et al. |
| 5,411,072 A | 5/1995 | Starck |
| 5,456,303 A | 10/1995 | Horinouchi |
| 5,477,902 A | 12/1995 | Kraeutler |
| 5,542,460 A | 8/1996 | McKeon |
| 5,577,348 A | 11/1996 | Keller |
| 5,638,639 A | 6/1997 | Goodman et al. |
| 5,749,407 A | 5/1998 | Brenner et al. |
| 5,828,972 A | 10/1998 | Asanuma et al. |
| 5,947,178 A | 9/1999 | Patten |
| 6,035,918 A | 3/2000 | Kraeutler |
| 6,098,695 A | 8/2000 | Schwingle |
| 6,145,568 A | 11/2000 | Lundstrom |
| 6,209,171 B1 | 4/2001 | Pelletier et al. |
| 6,223,804 B1 | 5/2001 | Toti |
| 6,267,169 B1 | 7/2001 | McDonald |
| 6,283,189 B1 | 9/2001 | Liebscher |
| 6,286,258 B1 | 9/2001 | Bischof et al. |
| 6,360,518 B1 | 3/2002 | Scott et al. |
| 6,378,440 B1 | 4/2002 | Rhodes |
| 6,601,637 B2 | 8/2003 | Toti |
| 6,615,894 B1 | 9/2003 | McKeon |
| 6,662,848 B2 | 12/2003 | Goodman et al. |
| 6,708,094 B2 | 3/2004 | Charaudeau |
| 6,766,847 B1 | 7/2004 | Wang |
| 7,050,283 B2 | 5/2006 | Field et al. |
| 7,066,297 B2 | 6/2006 | Goodman et al. |
| 7,190,132 B2 | 3/2007 | Goodman et al. |
| 7,478,663 B2 | 1/2009 | Goodman et al. |
| 7,513,293 B2 | 4/2009 | Goodman et al. |
| 7,647,729 B2 | 1/2010 | Polus |
| 7,656,129 B2 | 2/2010 | Banta et al. |
| 7,699,089 B2 | 4/2010 | Knutson et al. |
| 7,737,860 B2 | 6/2010 | Banta et al. |
| 7,740,046 B2 | 6/2010 | Goodman et al. |
| 7,782,019 B2 | 8/2010 | Banta et al. |
| 7,845,384 B2 | 12/2010 | Goodman et al. |
| 7,845,385 B2 | 12/2010 | Goodman et al. |
| 7,845,386 B2 | 12/2010 | Coleman et al. |
| 7,854,248 B2 | 12/2010 | Coleman et al. |
| 7,874,341 B2 | 1/2011 | Coleman et al. |
| 7,886,804 B2 | 2/2011 | Goodman et al. |
| 7,926,538 B2 | 4/2011 | Coleman et al. |
| 7,931,067 B2 | 4/2011 | Goodman et al. |
| 8,051,616 B2 | 11/2011 | George |
| 8,496,038 B2 * | 7/2013 | Kondash et al. ........... 160/84.08 |
| 2003/0226645 A1 | 12/2003 | Toti |
| 2004/0069420 A1 | 4/2004 | Petriello |
| 2004/0173325 A1 | 9/2004 | Maas |
| 2005/0217802 A1 | 10/2005 | Goodman et al. |
| 2006/0144529 A1 | 7/2006 | Hemphill |
| 2007/0152427 A1 | 7/2007 | Olsen |
| 2007/0272370 A1 | 11/2007 | Knutson et al. |
| 2008/0105387 A1 | 5/2008 | Coleman |
| 2008/0105389 A1 * | 5/2008 | Goodman et al. ............ 160/203 |
| 2008/0115896 A1 | 5/2008 | Goodman |
| 2008/0169069 A1 | 7/2008 | Coleman |
| 2008/0264578 A1 | 10/2008 | Goodman et al. |
| 2009/0188633 A1 | 7/2009 | Goodman et al. |
| 2010/0102764 A1 | 4/2010 | Banta et al. |
| 2010/0214709 A1 | 8/2010 | Hall et al. |
| 2010/0299871 A1 | 12/2010 | Kondash et al. |
| 2011/0000625 A1 | 1/2011 | George |
| 2011/0005689 A1 | 1/2011 | Coleman et al. |
| 2011/0024061 A1 | 2/2011 | Bell et al. |
| 2011/0036016 A1 | 2/2011 | Knight et al. |
| 2011/0036509 A1 | 2/2011 | Goodman et al. |
| 2011/0036513 A1 | 2/2011 | Banta et al. |
| 2011/0061820 A1 | 3/2011 | Coleman et al. |
| 2011/0088322 A1 | 4/2011 | Coleman et al. |
| 2011/0093095 A1 | 4/2011 | Goodman et al. |
| 2011/0186249 A1 | 8/2011 | Coleman et al. |
| 2011/0203746 A1 | 8/2011 | Smart |
| 2011/0247275 A1 | 10/2011 | Coleman et al. |
| 2011/0247764 A1 | 10/2011 | Coleman et al. |

FOREIGN PATENT DOCUMENTS

| | | |
|---|---|---|
| DE | 29506707 U1 | 8/1995 |
| DE | 202005000165 U1 | 3/2006 |
| EP | 0111962 | 6/1984 |
| EP | 1630337 A1 | 3/2006 |
| GB | 1226442 | 3/1971 |

(56) References Cited

FOREIGN PATENT DOCUMENTS

| | | |
|---|---|---|
| JP | 07317422 | 5/1995 |
| JP | 07317423 | 5/1995 |
| WO | 2005098189 A1 | 10/2005 |

OTHER PUBLICATIONS

PCT Written Opinion for Application No. PCT/US2008/061167 dated Oct. 14, 2008.

PCT Written Opinion for Application No. PCT/US2008/083520 dated Mar. 25, 2008.

PCT Written Opinion for Application No. PCT/US2007/083526 dated Oct. 7, 2008.

PCT Written Opinion for Application No. PCT/US2008/085504 dated Feb. 24, 2009.

PCT International Search Report for Application No. PCT/US2008/083520 dated Mar. 25, 2008.

PCT International Search Report for Application No. PCT/US2007/083526 dated Oct. 7, 2008.

PCT International Search Report for Application No. PCT/US2008/061167 dated Oct. 14, 2008.

PCT International Search Report for Application No. PCT/US2008/085504 dated Feb. 24, 2009.

\* cited by examiner

METHODS, APPARATUSES, AND SYSTEMS FOR RESISTING LATERAL DISPLACEMENT OF MOVABLE PARTITIONS

CROSS-REFERENCE TO RELATED APPLICATIONS

This application is a continuation-in-part of U.S. patent application Ser. No. 13/149,520 filed May 31, 2011, now U.S. Pat. No. 8,960,257, issued Feb. 24, 2015, and titled "Methods, Apparatuses, and Systems for Controlling Lateral Displacement of a Movable Partition," the disclosure of which is incorporated herein in its entirety by this reference.

TECHNICAL FIELD

Embodiments of the present disclosure generally relate to movable partitions and, more particularly, to methods and structures for hindering undesirable lateral displacement of a movable partition.

BACKGROUND

Movable partitions are utilized in numerous situations and environments for a variety of purposes. Such partitions may include, for example, foldable or collapsible doors configured to enclose or subdivide a room or other area. Often such partitions may be utilized simply for purposes of versatility in being able to subdivide a single large room into multiple smaller rooms. The subdivision of a larger area may be desired, for example, to accommodate multiple groups or meetings simultaneously. In other applications, such partitions may be utilized for noise control depending, for example, on the activities taking place in a given room or portion thereof.

Movable partitions may also be used to provide a security barrier, a fire barrier, or a combination thereof. In such a case, the collapsible door may be configured to automatically close upon the occurrence of a predetermined event such as the actuation of an associated alarm. For example, one or more accordion or similar folding-type doors may be used as a security door, a fire door, or a combination thereof wherein each door is formed with a plurality of panels hingedly connected to one another. The hinged connection of the panels allows the door to fold up in a compact unit for purposes of storage when not deployed. Thus, the door may be stored, for example, in a pocket formed in the wall of a building when in a retracted or folded state. When deployment of the door is required to secure an area during a fire or for any other specified reason, the door is driven by a motor along a track, conventionally located above the door in a header, until the door is extended a desired distance across the room to form an appropriate barrier.

When deployed, a leading edge of the door, which may be defined by a component known as a lead post, complementarily engages a receptacle in a fixed structure, such as a wall, or in a mating receptacle of another door. Such a receptacle may be referred to as a striker or a door post when formed in a fixed structure, or as a mating lead post when formed in another door. It is desirable that the lead post be substantially aligned with the mating receptacle such that the door may be completely closed and an appropriate seal formed between the door and mating receptacle. For example, if the door is being used as a fire door, it is desirable that the lead post of a door is fully engaged with the mating receptacle to prevent drafts and any attendant flames or smoke from traversing the barrier formed by the partition and, more particularly, the joint formed by the lead post and receptacle.

In some cases, during opening and closing, the lower edge of the door may be laterally displaced relative to the top edge of the door, which is relatively fixed in a lateral sense due to its engagement with the track and header. Such lateral displacement of the door's lower edge may be caused, for example, by the opening and closing processes, by a fire-induced draft, by an improperly balanced HVAC system, or simply from an occupant of a room pushing against the door while it is being deployed. If the lower edge of the lead post is laterally displaced relative to its upper edge as the leading edge of the door approaches the mating receptacle, the lead post will not be properly aligned with the mating receptacle and an appropriate seal will not be formed. Moreover, if the lower edges of the panels become displaced relative to their upper edges, the door may not be positioned as desired and the out-of-plumb configuration may cause problems with operation of the door.

As noted above, the failure of the lead post to properly engage the receptacle may have substantial consequences when, for example, the door is being used as a fire or security barrier. At a minimum, even when the door is not used as a fire or security barrier, the failure of the lead post to properly engage the mating receptacle will result in the inability to completely subdivide a larger room and visually or acoustically isolate the subdivided room.

One approach to preventing or controlling the lateral displacement of a lower edge of the door has included forming a guide track within the floor of a room and then causing the door or barrier to engage the track as it is deployed and retracted such that the door is laterally constrained relative to the path of the track. However, the placement of a track in the floor of a room is not an ideal solution for all environments. For example, such a track provides a place for collection of dust and debris and may, thereby, become an unsightly feature of the room. In some cases, the collection of debris may affect the proper operation of the door itself. Additionally, the existence of a track in the floor, regardless of whether it is protruding from the floor or recessed within the floor, may act as a hazard or potential source of injury depending, for example, on the intended use of the area and the actual location of the floor track within that area.

Moreover, even if one were to use a track in the floor, floors often exhibit an undesirable amount of unevenness presenting additional difficulties. For example, it becomes difficult to install an even and level track in a floor or other supporting surface that is not even. If the track is not substantially even and level, the bottom edge of the partition, or some component associated therewith, may have trouble maintaining engagement with the track while it is being displaced. Likewise, other devices that may attempt to maintain engagement with (or maintain some other specified relationship with) an adjacent or an underlying surface may experience difficulty doing so due to the unevenness and undulating nature of such a surface.

In view of the current state of the art, it would be advantageous to provide methods, apparatuses and systems with improved and simplified control of lateral movement of hinged panels forming a movable partition.

BRIEF SUMMARY

Embodiments of the present disclosure provide improved and simplified control of lateral movement of hinged panels forming a movable partition.

In accordance with one embodiment of the present disclosure, an apparatus for controlling lateral displacement of a movable partition includes a bracket, a roller assembly, a first attachment bracket, and a second attachment bracket. The roller assembly is coupled to the bracket and includes at least one roller element. The first attachment bracket is configured for attachment to a first panel of the movable partition and configured for a first hinged coupling to a first side of the bracket such that a first pivot line of the first hinged coupling substantially coinciding with a centerline of the first panel. The second attachment bracket is configured for attachment to a second panel of the movable partition and configured for a second hinged coupling to a second side of the bracket such that a second pivot line of the second hinged coupling substantially coinciding with a centerline of the second panel.

In accordance with another embodiment of the present disclosure, a displacement control assembly for a movable partition includes a bracket, a first attachment bracket hingedly coupled to a first side of the bracket to form a first pivot line, and a second attachment bracket hingedly coupled to a second side of the bracket to form a second pivot line. A roller assembly including at least one roller element is coupled to the bracket between the first pivot line and the second pivot line. When assembled, the first attachment bracket is attached to a first panel of the movable partition with the first pivot line substantially in line with a centerline of the first panel and the second attachment bracket is attached to a second panel of the movable partition with the second pivot line substantially in line with a centerline of the second panel. The roller assembly is positioned to contact a surface of an adjacent structure and provide resistance to a lateral movement of a lower edge of the first panel relative to an upper portion of the first panel.

In accordance with a further embodiment of the present disclosure, a method of controlling a movable partition includes providing a roller assembly coupled to one or more panels of the movable partition such that at least one roller element of the roller assembly is in contact with a surface of an adjacent structure that the one or more panels will traverse. The method also includes displacing the movable partition along a path adjacent the surface of the adjacent structure. A substantially plumb inclination of the one or more panels is maintained by resisting movement of the at least one roller element in a direction substantially perpendicular to the path while the roller assembly is hingedly coupled to each of the one or more panels along a centerline of each of the one or more panels.

In accordance with yet another embodiment of the present disclosure, an automatic door includes a plurality of pivotably coupled panels, a drive configured to motivate the plurality of pivotably coupled panels along a defined pathway, and one or more apparatuses coupled proximate a lower edge of one or more of the pivotably coupled panels. Each of the apparatuses includes a bracket, a roller assembly attached to the bracket and includes at least one roller element, a first attachment bracket is hingedly coupled to a first side of the bracket to form a first pivot line, and a second attachment bracket is hingedly coupled to a second side of the bracket to form a second pivot line. The first attachment bracket is attached to a first panel of the pivotably coupled panels such that the first pivot line aligns with a centerline of the first panel and the second attachment bracket is attached to a second panel of the pivotably coupled panels such that the second pivot line aligns with a centerline of the second panel.

In yet further embodiments, the present disclosure includes movable partition systems that comprise a movable partition and one or more lateral stabilization apparatuses. The movable partition has a first sheet of panels and a second sheet of panels located beside the first sheet of panels. Each of the first sheet of panels and the second sheet of panels comprises a plurality of panels coupled to one another in a manner allowing adjacent panels of the plurality of panels to pivot relative to one another. The one or more stabilization apparatuses may be disposed between the first sheet of panels and the second sheet of panels, and may be configured to impart lateral stability to the movable partition. Each of the one or more lateral stabilization apparatuses may include at least one stabilization bracket, a first hinge coupling the at least one stabilization bracket to a first panel of the plurality of panels of the first sheet of panels, and a second hinge coupling the at least one stabilization bracket to a second panel of the plurality of panels of the second sheet of panels. A hinge axis of the first hinge may be at least substantially vertically oriented, and a hinge axis of the second hinge may be at least substantially vertically oriented.

In additional embodiments, the present disclosure includes methods of installing movable partition systems. In accordance with such methods, a movable partition may be provided that includes a first sheet of panels and a second sheet of panels. Each of the first sheet of panels and the second sheet of panels may comprise a plurality of panels coupled to one another in a manner allowing adjacent panels of the plurality of panels to pivot relative to one another. To install each of the one or more lateral stabilization apparatuses on the movable partition, a first hinge may be attached to a first panel of the plurality of panels of the first sheet of panels, and a hinge axis of the first hinge may be oriented generally along a vertical centerline of the first panel. A second hinge may be attached to a second panel of the plurality of panels of the second sheet of panels, and a hinge axis of the second hinge may be oriented generally along a vertical centerline of the second panel. At least one stabilization bracket may be coupled between the first hinge and the second hinge.

BRIEF DESCRIPTION OF THE SEVERAL VIEWS OF THE DRAWINGS

Details of the disclosure will become apparent upon reading the following detailed description and upon reference to the drawings, in which.

DETAILED DESCRIPTION

Figure 1A:
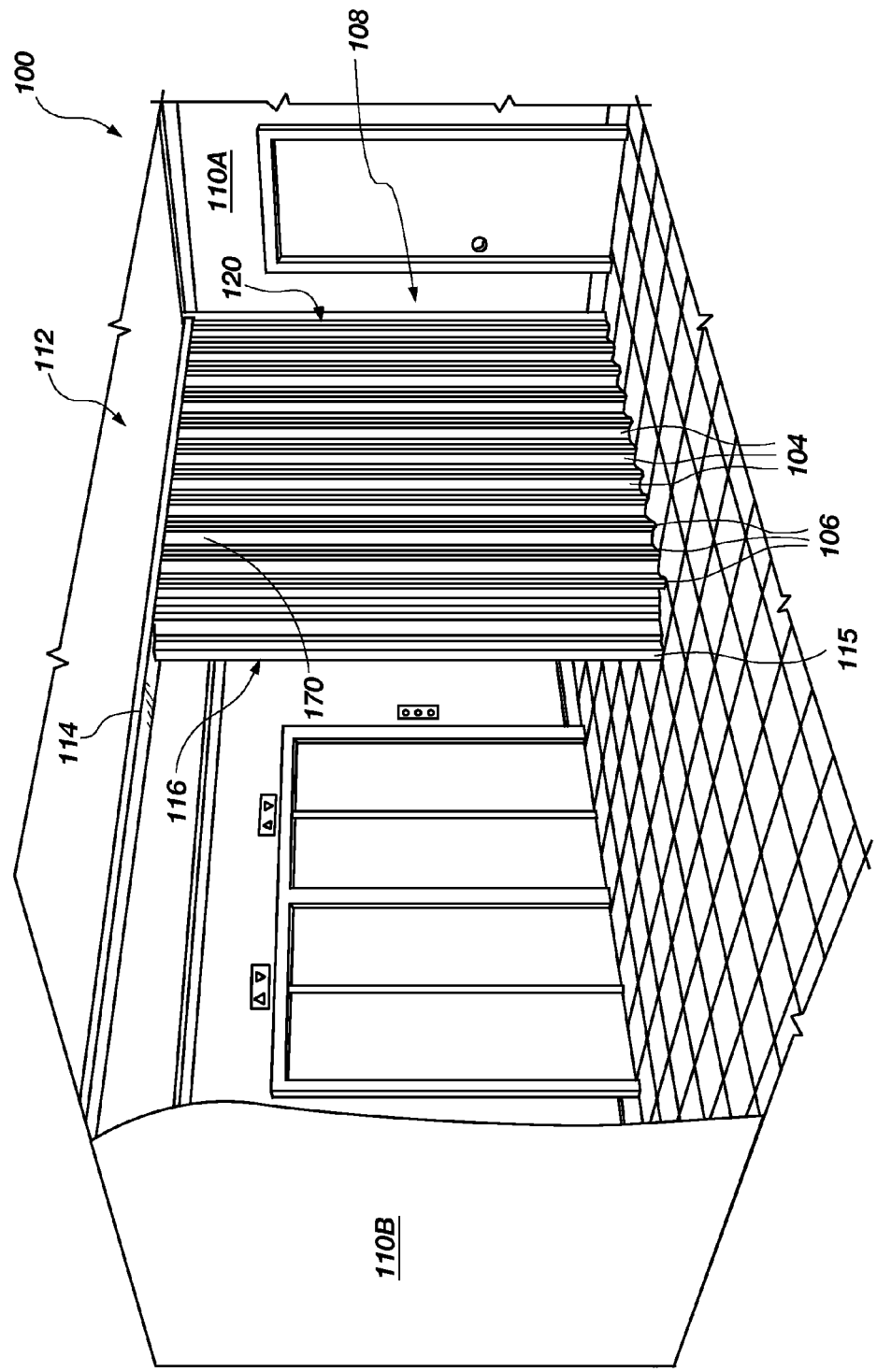
FIGS. 1A-1C show a perspective view, a side view and a top view, respectively, of an embodiment of a movable partition system of the present disclosure, which includes a lateral stabilization apparatus.

In this description, specific implementations shown and described are only examples and should not be construed as the only way to implement the present disclosure unless specified otherwise herein. It will be readily apparent to one of ordinary skill in the art that the various embodiments of the present disclosure may be practiced by numerous other partitioning solutions. Common elements of the illustrated embodiments may be designated with the same or similar reference numerals. It should be understood that the figures presented are not meant to be illustrative of actual views of any particular portion of an actual system or device, but are merely idealized representations employed to describe embodiments of the disclosure. It is to be understood that other embodiments may be utilized within the scope of the disclosure.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element.

Embodiments of the present disclosure provide improved and simplified control of undesirable lateral displacement of a movable partition.

Figure 1B:
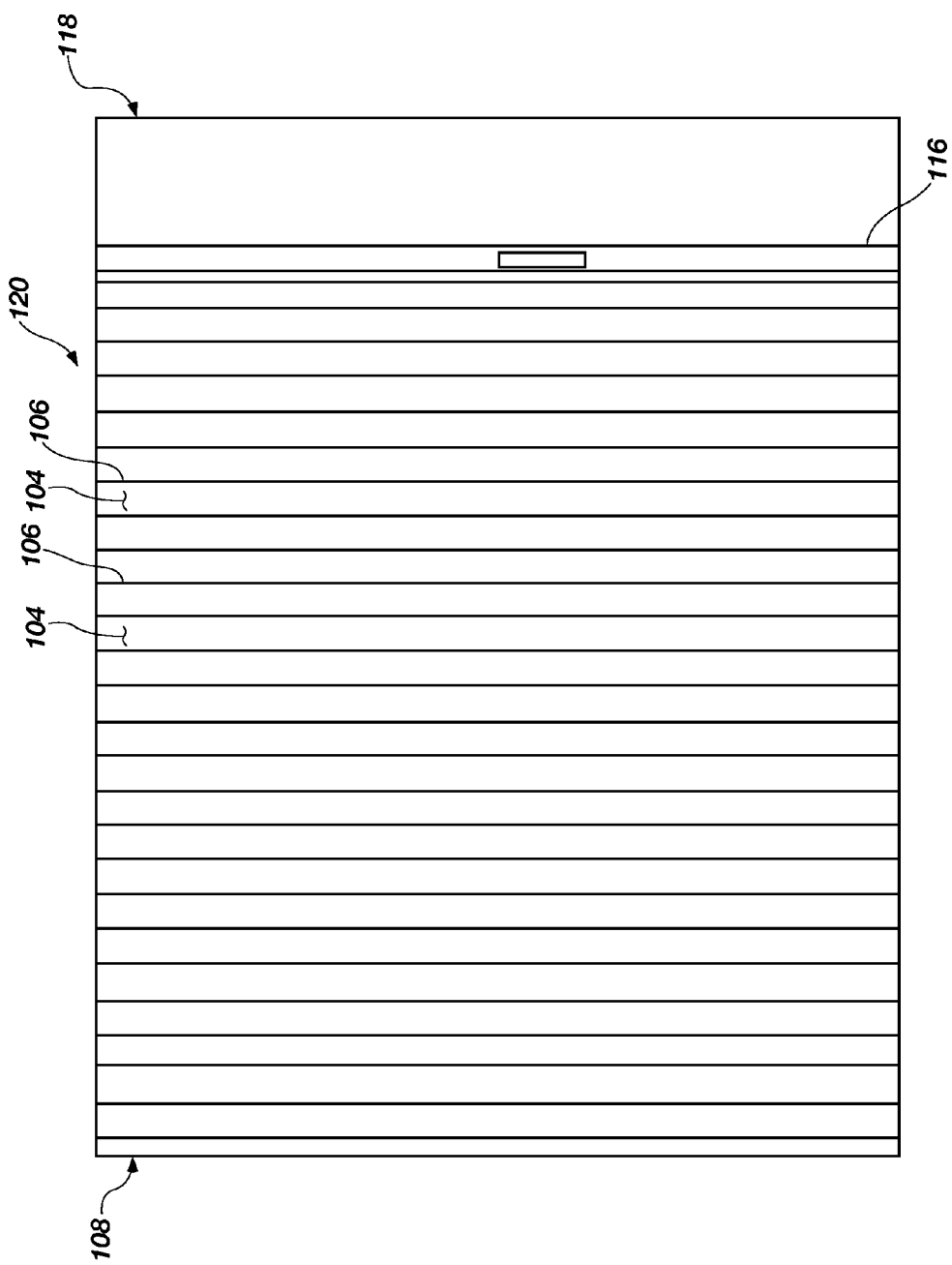
Figure 1C:
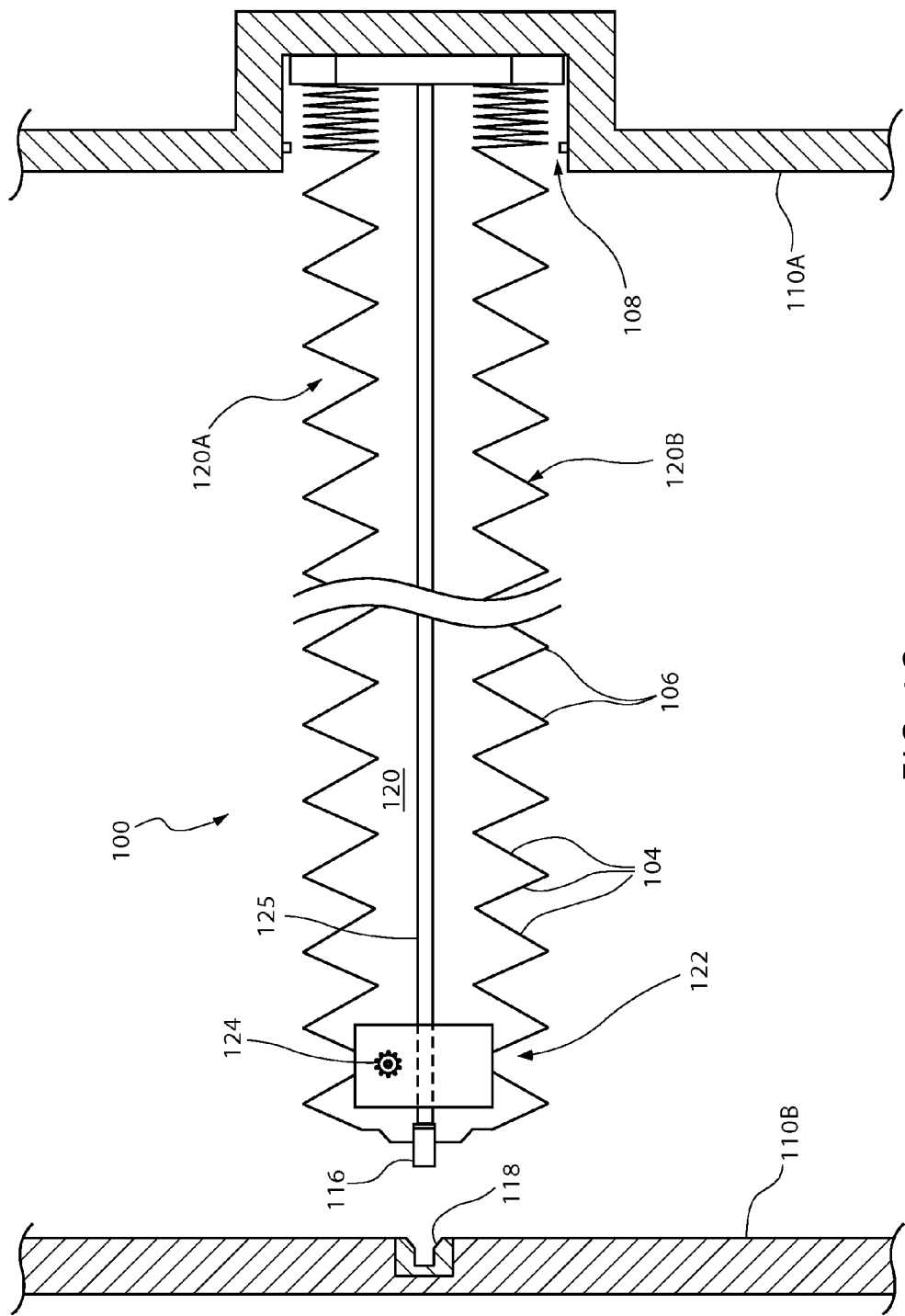

Referring to FIGS. 1A-1C, a movable partition system 100 is shown, which may also be referred to as an automatic door system, including a movable partition 120 in the form of an accordion type door that can be extended to a closed state or retracted to an open state. The movable partition 120 may be used, for example, as a security and/or fire barrier. In other embodiments, the movable partition 120 need not be utilized as a fire or security barrier, but may be used simply for the subdividing of a larger space into smaller rooms or areas. The movable partition 120 may be formed with a plurality of panels 104 that are connected directly to one another, or indirectly to one another using hinges, other hinge like members, or other coupling devices there between that enable a pivoting between the panels 104. In other words, the panels 104 may be coupled to one another in a manner allowing the panels 104 to pivot relative to one another. As a non-limiting example, the panels 104 may be configured in a manner that they interlock directly with one another, while still allowing adjacent panels 104 to pivot relative to one another where they are interlocked. For simplicity in explanation, and not for limitation, the pivot-like coupling may be referred to herein as using pivotable couplings 106. The pivotably coupled panels 104 enable the movable partition 120 to be compactly stored or "stacked" in a pocket 108 formed in a wall 110A of a building when in the retracted or folded state.

When it is desired to deploy the movable partition 120 to an extended position, for example, to secure an area such as an elevator lobby 112 during a fire, the movable partition 120 is driven along a track 114 across the space to provide an appropriate barrier. When in a deployed or an extended state, a leading edge of the movable partition 120, shown in the presently described embodiment as a male lead post 116, complementarily or matingly engages with a jamb or door post 118 that may be formed in a wall 110B of a building.

As can be seen in FIG. 1C, an accordion type movable partition 120 may include a first sheet 120A of panels 104 and a second sheet 120B of panels 104 that is laterally spaced from the first sheet 120A. Such a configuration may be utilized as a fire door wherein one partition 120A acts as a primary fire and smoke barrier, a space between the two partitions 120A and 120B acts as an insulator or a buffer zone, and the second partition 120B acts as a secondary fire and smoke barrier. Such a configuration may also be useful in providing an acoustical barrier when the movable partition 120 is used to subdivide a larger space into multiple, smaller rooms.

A drive 122, which may include, for example, a motor 124 and a drive belt or chain 125 (FIG. 1C), may be configured to automatically open and close the movable partition 120 upon actuation of the drive 122. The movable partition system 100 may further include various sensors and switches to assist in the control of the movable partition 120 through appropriate connection with the drive 122. For example, when used as a fire door, the movable partition 120 may include a switch or actuator, commonly referred to as "panic hardware" or "fire exit hardware." Actuation of the switch or actuator allows a person located on one side of the movable partition 120 to cause the movable partition 120 to open if it is closed, or to stop while it is closing, allowing access through the barrier formed by the movable partition 120 for a predetermined amount of time. Moreover, the movable partition system 100 may further include, or may be associated with, an alarm system which, upon providing an appropriate signal, results in deployment or retraction of the movable partition 120 depending on the specific situation.

It is also noted that, while the exemplary embodiment shown and described with respect to FIGS. 1A-1C is directed to a single accordion type movable partition 120, other movable partitions may be utilized. For example, a two-door, or bi-part door, system may be utilized wherein two similarly configured doors extend across a space and join together to form an appropriate barrier. Also, the present disclosure may be applicable to movable partitions or barriers other than the accordion-type doors that are shown and described herein in example embodiments.

Referring still to FIGS. 1A-1C, the movable partition 120 of the present disclosure may further include at least one lateral stabilization apparatus that may be used to impart lateral stability and hinder undesirable lateral displacement of the movable partition 120 or at least a portion thereof. For example, upon the exertion of an external force in a generally lateral direction, such as by a draft or from an individual pushing on the movable partition 120 while it is being deployed or retracted, the panels 104 of the movable partition 120 may deviate from their intended plumb, or substantially vertical, orientation. In other words, the lower portion of the movable partition 120, such as a lower edge 115, may become laterally displaced relative to an upper portion 170 of the movable partition 120, the upper portion 170 being substantially laterally fixed by virtue of its engagement with the track 114. As previously discussed, in such a case where the lead post 116 is substantially out of plumb (e.g., not substantially vertically oriented), the lead post 116 will not properly engage the jamb or door post 118 and will prevent the movable partition 120 from properly closing and forming a proper barrier. However, in accordance with the present disclosure, the directional control apparatus may be configured to reduce a deviation of the movable partition 120 from its desired course or orientation, such as with respect to a plumb inclination.

Figure 2:
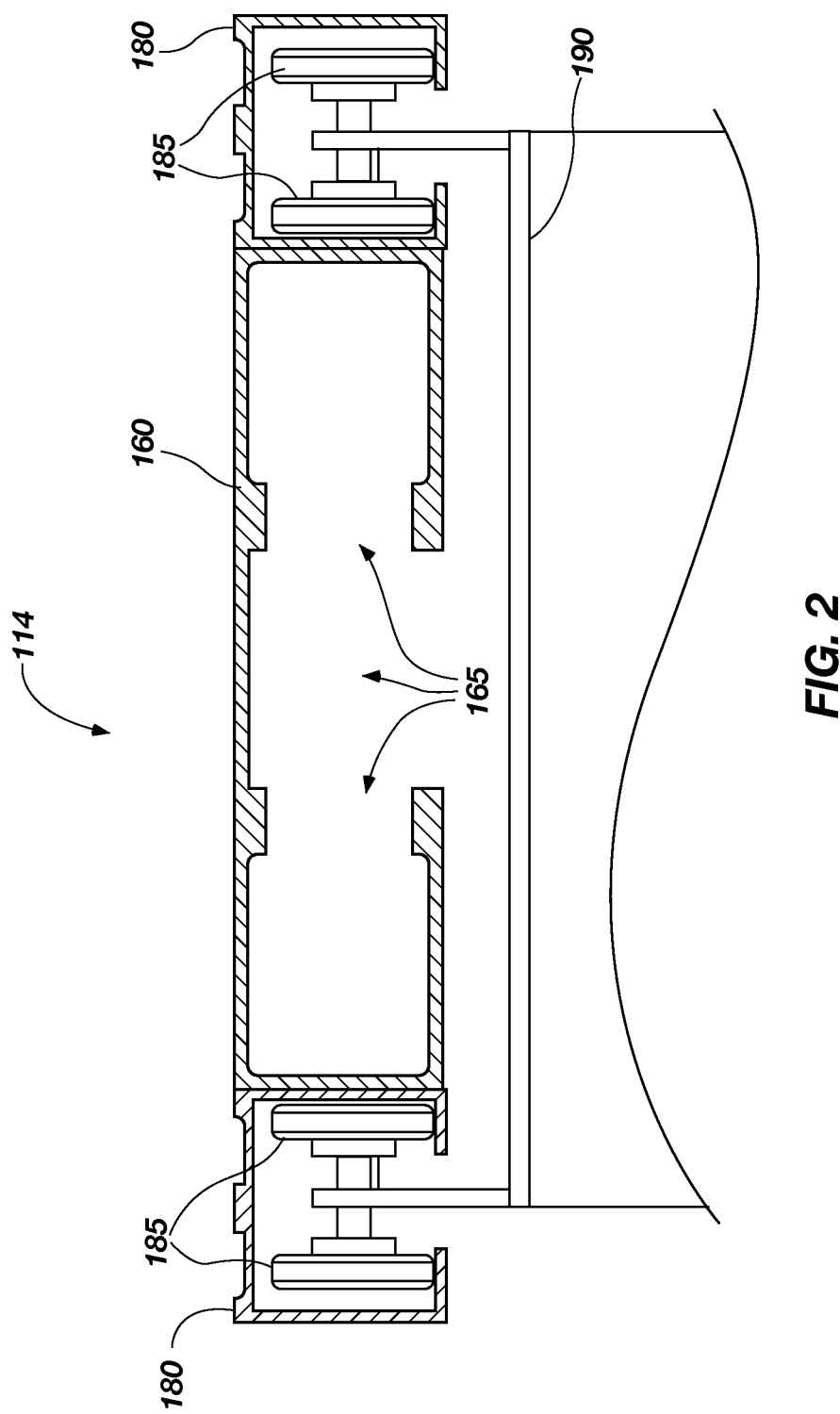
FIG. 2 is a cross-section view of a track of the movable partition system from which a movable partition may be suspended.

FIG. 2 shows a cross-section view of a track 114 that may be used when accompanied with an embodiment of the present disclosure. That track 114 is illustrated merely as an example of a type of track that may be used with movable partitions 120 used with embodiments of the present disclosure. A support system may comprise the track 114, which may comprise an elongated drive guide member 160 located generally centrally in the track 114, and two elongated roller guide members 180 disposed on opposite lateral ends of the elongated drive guide member 160. In some embodiments, the drive guide member 160 and roller guide members 180 may comprise separate bodies or structures that are attached to one another, or simply installed proximate one another. In other embodiments, the drive guide member 160 and roller guide members 180 may comprise different regions of a single, unitary body or structure.

The drive guide member 160 may comprise a hollow body having internal surfaces defining a drive channel 165 that extends longitudinally through the drive guide member 160 and is located generally centrally in the track 114. The drive channel 165, also known as an internal channel, defined by the drive guide member 160, may be used to at least partially house rollers (e.g., wheels), drive mechanism components (e.g., an elongated drive member), or other components of the movable partition system 100 (not shown) as known in the art. Each of the roller guide members 180 may also comprise a hollow body having internal surfaces defining internal roller channels that extend longitudinally through each roller guide member 180 and are located at opposing lateral ends of the drive guide member 160. The roller channels may be partially defined by a bottom surface and innermost side surfaces internal to the roller guide members 180. Thus, the bottom and innermost side surfaces may define portions of the internal roller channels of the track 114. Portions of the partition system 100, such as, for example, the movable partition 120 and the lead post 116 (see FIG. 1C), may be suspended from (i.e., hang from) a trolley 190 and move along the track 114 by the rolling of partition support rollers 185 (e.g., wheels or bearings) within and along the roller channels that extend through the roller guide members 180 of the track 114 in a direction at least substantially parallel to a direction of movement of the movable partition 120.

Figure 3:
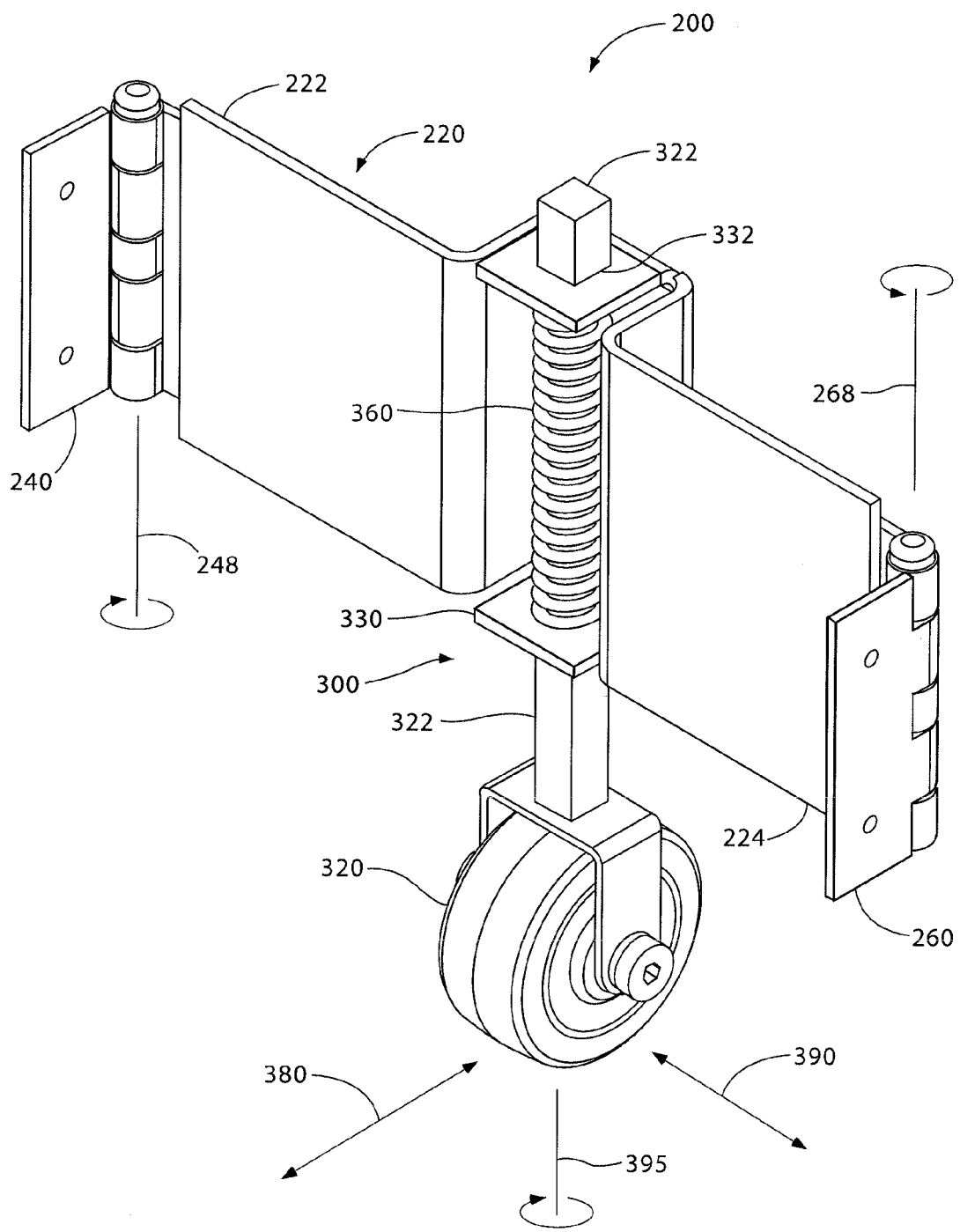
FIG. 3 is a perspective view of a lateral stabilization apparatus that includes a lateral displacement bracket and a roller assembly in accordance with an embodiment of the present disclosure.

FIG. 3 shows a perspective view of a lateral stabilization apparatus 200 in accordance with an embodiment of the present disclosure. A stabilization bracket 220 includes a first side 222 and a second side 224. A receiver 330 is positioned between the first side 222 and the second side 224 and is configured for receiving a roller assembly 300. The receiver 330 may be an integral part of the stabilization bracket 220 or may be affixed to the stabilization bracket 220, such as, for example, by weld, adhesive, or screws. The receiver 330 includes one or more holes 332 for accepting a pin 322. In the embodiment shown in FIG. 3, the holes 332 and pin 322 are shown as square, which helps resist pivoting of the roller assembly 300, as explained below. Of course, other polygonal shapes for the pin 322 and compatible polygonal holes 332 may be used. Moreover, in some cases, as explained below, a circular pin 322 and hole 332 may also be used.

A first hinge 240 is coupled to the first side 222 such that a portion of the first hinge 240 pivots relative to the first side 222 of the stabilization bracket 220 along a first hinge axis 248. Similarly, a hinge 260 is coupled to the second side 224 such that the hinge 260 pivots relative to the second side 224 of the stabilization bracket 220 along a second hinge axis 268.

The roller assembly 300 moves along a line of travel 380 and resists lateral movement of the lateral stabilization apparatus 200 in a lateral direction 390. In addition, various roller pivot control structures may be used for resisting a pivoting motion 395 of one or more roller elements 320 (only one roller element 320 is shown in FIG. 3).

A longitudinal biasing element 360, such as a coil spring, may be coupled between the roller assembly 300 and the stabilization bracket 220 to provide a substantially vertical biasing force to keep the roller element 320 in contact with a floor surface (not shown).

Figure 4:
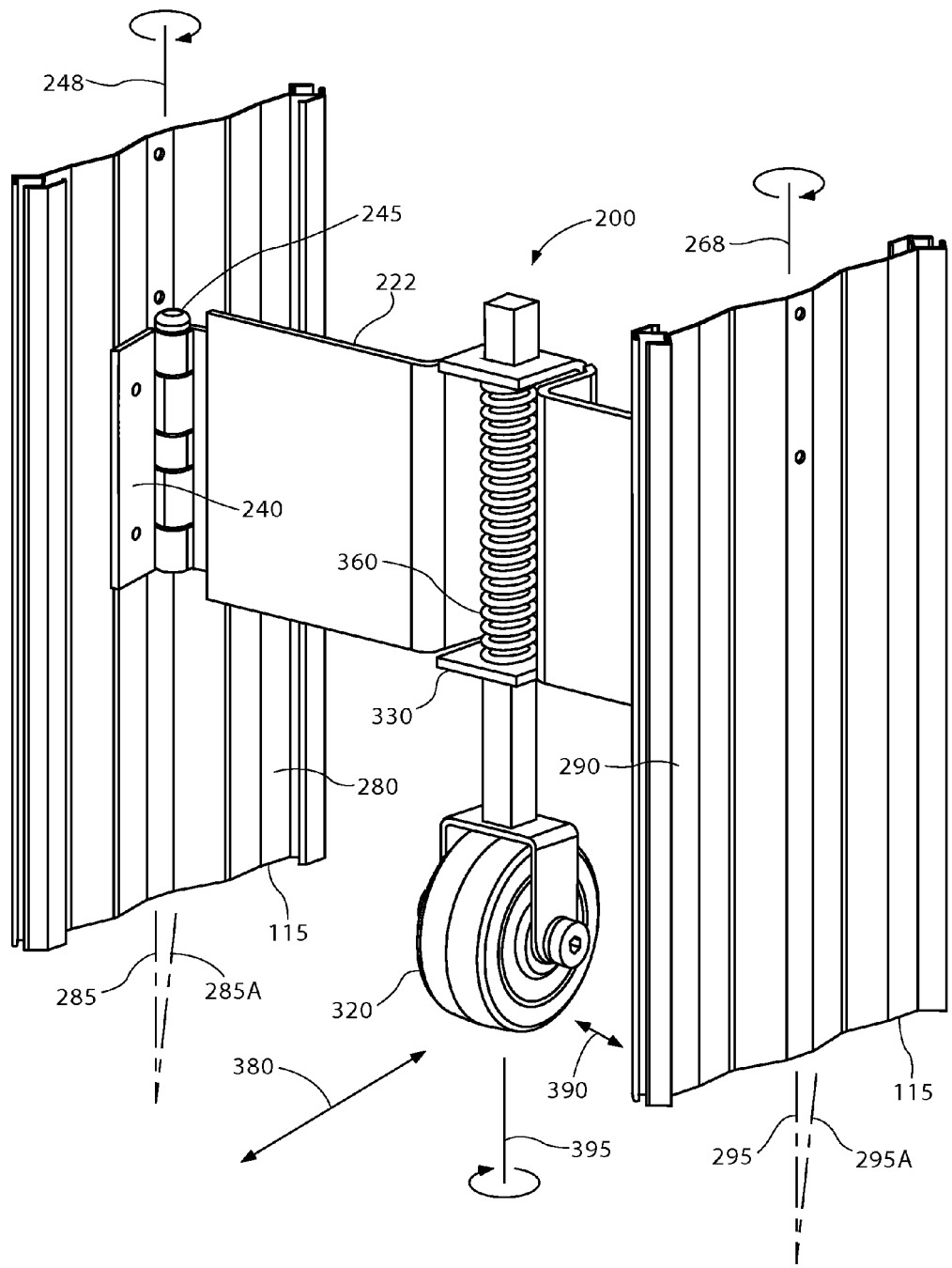
FIG. 4 is a perspective view of the lateral displacement bracket and the roller assembly of FIG. 3 attached to panels of a movable partition in accordance with an embodiment of the present disclosure.

FIG. 4 shows a perspective view of the lateral stabilization apparatus 200 of FIG. 3 attached to panels (280, 290) of a movable partition in accordance with an embodiment of the present disclosure. A first panel 280 is attached to the portion of the first hinge 240 that pivots relative to the stabilization bracket 220. Also, hidden from view behind a second panel 290, the second panel 290 is attached to the portion of the second hinge 260 that pivots relative to the stabilization bracket 220. As previously discussed, the first hinge 240 provides and pivots about a hinge axis 248 and the second hinge 260 provides and pivots about a second hinge axis 268.

Figure 5:
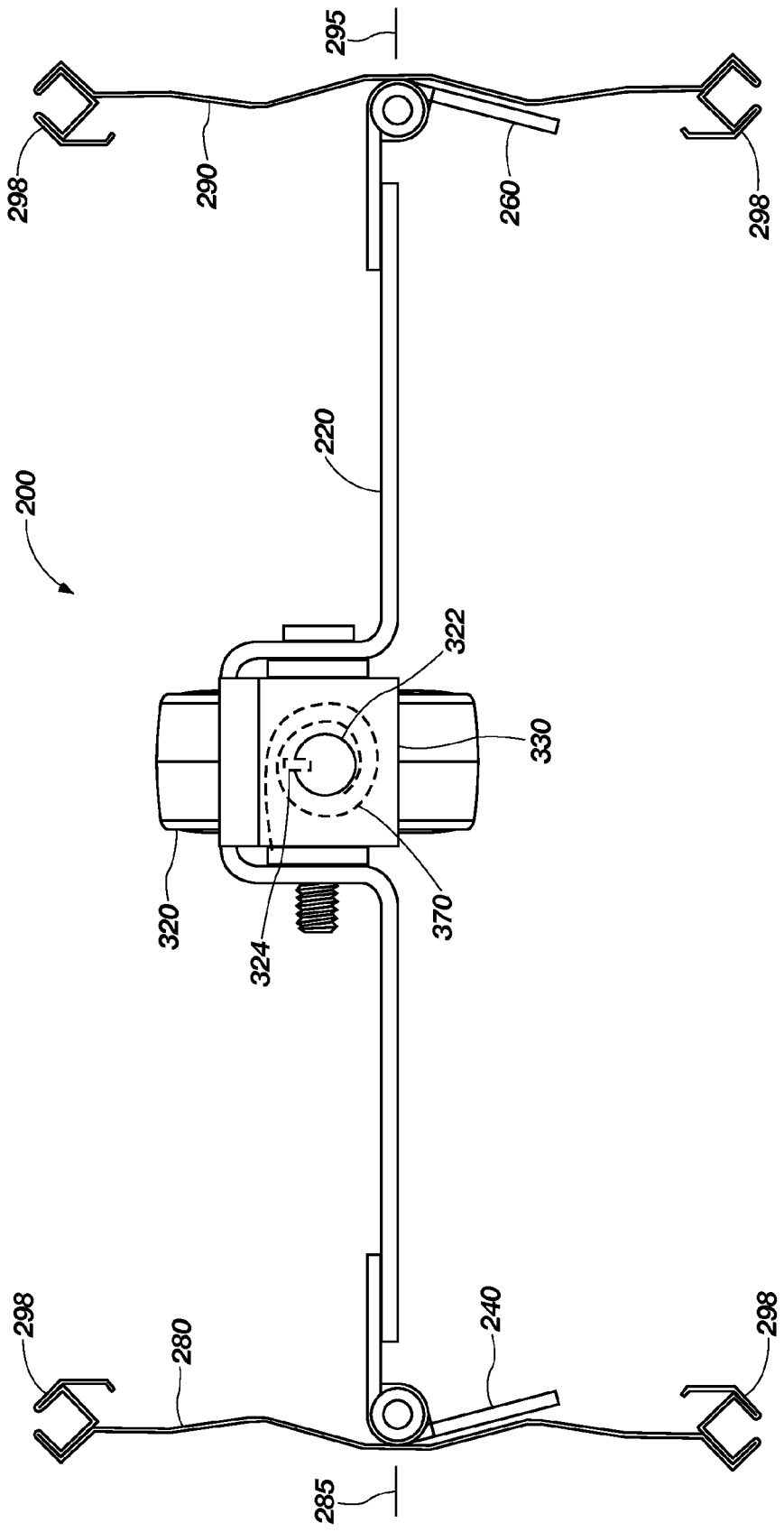
FIG. 5 is a top view of the lateral displacement bracket and roller assembly attached to panels of the movable partition in accordance with an embodiment of the present disclosure.

FIG. 5 shows a top view of the lateral stabilization apparatus 200 attached to panels (280, 290) of the movable partition in accordance with an embodiment of the present disclosure. The first hinge 240 couples the stabilization bracket 220 to a first panel 280 of a first sheet of panels, and the second hinge 260 couples an opposing side of the stabilization bracket 220 to a second panel 290 of a second sheet of panels.

The attachment brackets (240, 260) may be attached to the panels (280, 290) with any suitable attachment mechanism, such as, for example, screws, rivets, adhesives, and the like.

The first hinge 240 may be oriented such that the first hinge axis 248 is at least substantially vertically oriented, and the second hinge 260 may be oriented such that the second hinge axis 268 is at least substantially vertically oriented.

A first centerline 285 may be defined for the first panel 280 and a second centerline 295 may be defined for the second panel 290. Each of the centerlines 285, 295 of the panels 280, 290 defines a line that is substantially equidistant from the hinge structures 298 of the first panel 280 and the second panel 290, respectively.

The centerlines 285, 295 are shown as lines with a substantially plumb inclination in FIG. 4. In embodiments of the present disclosure, the centerline 285 of the first panel 280 substantially coincides with the first hinge axis 248. Stated another way, the first hinge 240 may be mounted directly to the first panel 280 proximate the vertical centerline 285 of the first panel 280. Similarly, the centerline 295 of the second panel 290 substantially coincides with the second hinge axis 268. Stated another way, the second hinge 260 may be mounted directly to the second panel 290 proximate the vertical centerline 295 of the second panel 290. With this configuration, when the panels (280, 290) rotate as the movable partition 120 opens or closes along the hinge axes 248 and 268 substantially in line with the centerlines 285 and 295, respectively, lateral forces, and lateral movement of the lateral stabilization apparatus 200 is substantially reduced or eliminated.

Reducing or eliminating the lateral displacement of the lateral stabilization apparatus 200 in the lateral direction 390 allows the first panel 280 and second panel 290 to remain substantially plumb and the roller element 320 to traverse along the intended line of travel 380. Without embodiments of the disclosure, the lower edge 115 of the first panel 280 and the lower edge 115 of the second panel 290 may move laterally relative to upper portions 170 of the panels (280, 290) causing the panels (280, 290) to move out of plumb as shown by angled lines 285A and 295A.

Some embodiments of the disclosure may include an additional mechanism for hindering undesirable lateral displacement of a movable partition in the lateral direction 390 transverse to the intended direction of movement of the movable partition. As stated previously when discussing FIG. 3, the roller assembly 300 may be prevented or impeded from pivoting in the pivoting motion 395 using a roller pivot control structure. The reduction in ability of the roller element 320 to pivot may assist in keeping the roller element 320 moving along the line of travel 380 and thus reduce movement of the roller element 320 in the lateral direction 390.

In FIG. 3, the roller pivot control structure took the form of a square pin 322 in a square hole 332. In FIG. 5, two other optional roller pivot control structures are shown. In FIG. 5, a round pin 322 is shown in a round hole. As a result, and referring to FIGS. 3 and 5, the roller lateral stabilization apparatus 200 would be relatively free to perform pivoting motion 395. However, a key 324 may be mated with slots in the round pin 322 and round hole to prevent the pivoting motion 395.

As another optional roller pivot control structure, a pivot biasing element 370 may be coupled between the pin 322 and the receiver 330 or stabilization bracket 220. This pivot biasing element 370 may be used to allow some pivoting motion 395, but still resist excessive pivoting motion 395. Allowing some pivoting motion 395, may be desirable in a situation where the line of travel 380 forms a curvilinear path on the floor or other structure in contact with the roller element 320.

As yet another optional roller pivot control structure, with suitable attachment to the pin 322 and the receiver 330 or stabilization bracket 220, the longitudinal biasing element 360 may be configured to provide a pivoting bias as well as the longitudinal bias.

Figure 6:
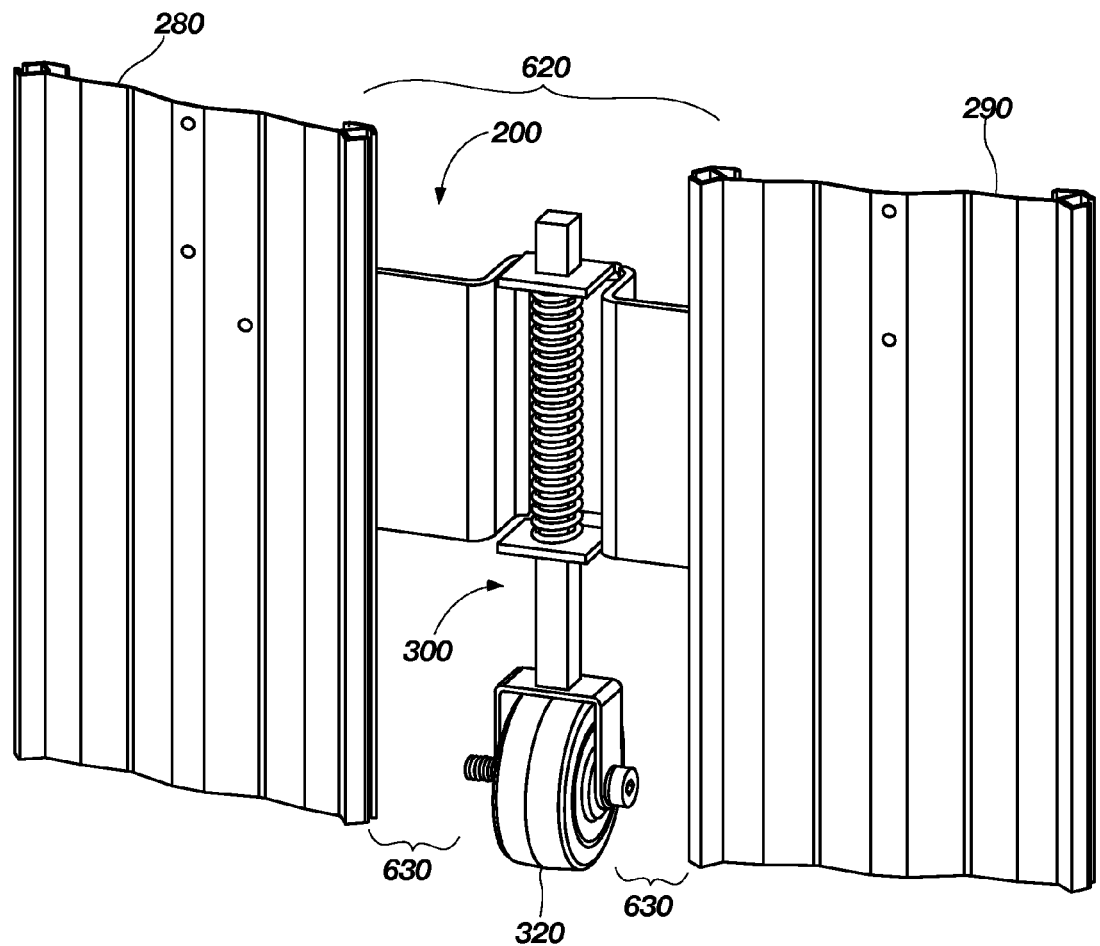
FIG. 6 is a perspective view of the lateral displacement bracket and roller assembly attached to panels of the movable partition with the partition in a folded position in accordance with an embodiment of the present disclosure.

FIG. 6 shows a perspective view of the lateral stabilization apparatus 200 attached to panels 280 and 290 of the movable partition with the panels 280 and 290 in a folded position in accordance with an embodiment of the present disclosure. FIG. 6 illustrates that the roller assembly 300 fits between the first panel 280 and the second panel 290 when they are in the folded position without causing the first and second panels 280 and 290 to be spaced any farther apart than for a movable partition using a conventional roller assembly. In other words, the spacing 620 between panels 280, 290 can be maintained the same as for many conventional movable partitions with adequate clearance 630 between the roller assembly 300 and each of the first and second panels 280 and 290. Moreover, when the roller element 320 is centered between the first and second panels 280 and 290, the clearance 630 on each side of the roller assembly 300 will be substantially the same.

Figure 7:
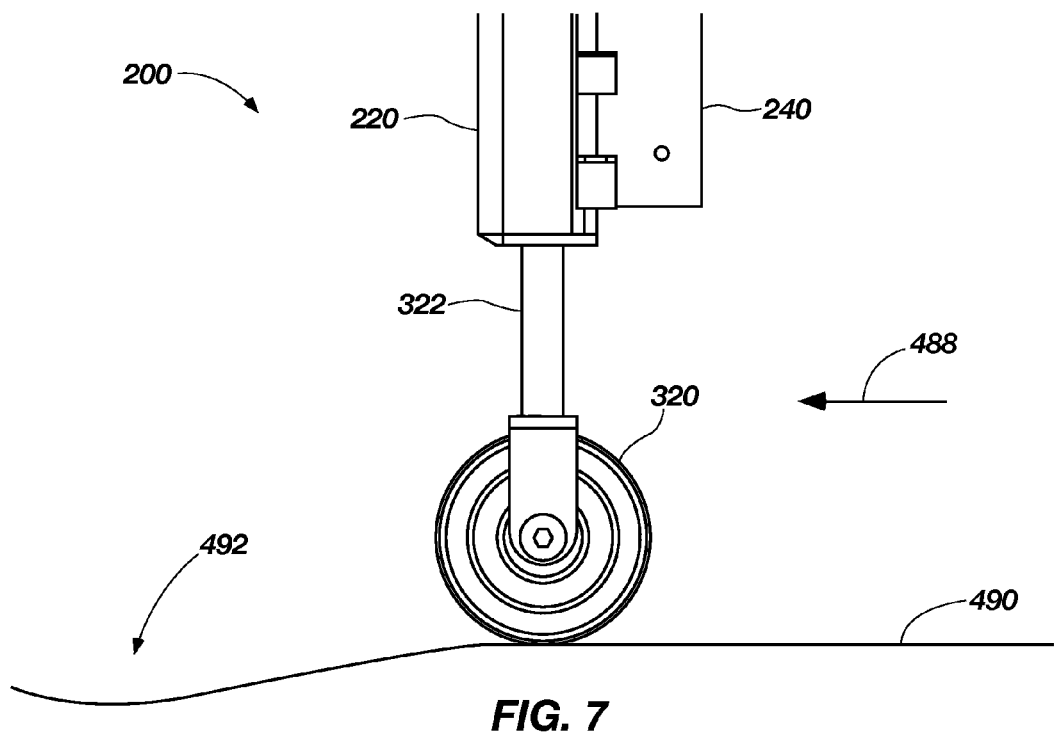
FIG. 7 is a side view of a portion of the lateral displacement bracket and roller assembly for operation on substantially nonplanar surface features of an adjacent structure in accordance with an embodiment of the present disclosure.

FIG. 7 is a side view of a portion of the lateral stabilization apparatus 200 for operation on substantially nonplanar surface features of an adjacent structure 490 in accordance with an embodiment of the present disclosure. The roller element 320 may roll along an adjacent structure 490, such as, for example, a floor of a room including the movable partition. FIG. 7 illustrates the roller element 320 coupled to the pin 322, which is coupled to the stabilization bracket 220. The first hinge 240 is also illustrated. The roller element 320 traverses the portion of the adjacent structure 490 that includes a valley 492. The longitudinal biasing element 360 (not shown in FIG. 7) causes the roller element 320 to maintain contact with the underlying surface 490 as it traverses the valley 492, and perhaps hills (not shown). Not only does the roller element 320 maintain contact with the adjacent structure 490 as it traverses the valley 492, it also maintains a force correlated to the spring constant of the longitudinal biasing element 360 between the roller element 320 and the adjacent structure 490 to help reduce or prevent lateral movement.

As the apparatus continues in the direction indicated by directional arrow 488, the roller element 320 encounters a further elevation change in the adjacent structure 490 as it leaves the valley 492. The longitudinal biasing element 360 will again maintain contact between the roller element 320 and the adjacent structure 490.

Figure 8:
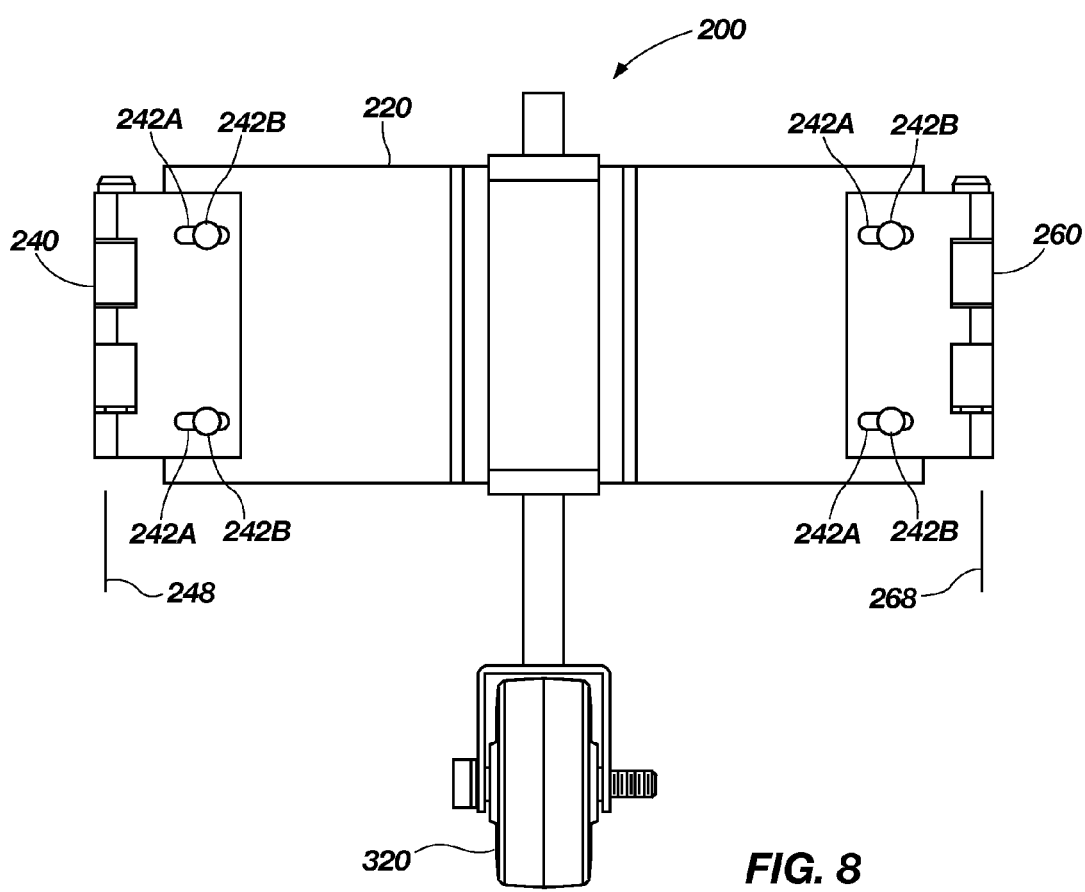
FIG. 8 is a front view of the lateral displacement bracket and roller assembly illustrating adjustment structures in accordance with an embodiment of the present disclosure.

FIG. 8 is a front view of the lateral stabilization apparatus 200 illustrating adjustment structures in accordance with an embodiment of the present disclosure. Bracket adjusters 242A and 242B are configured between the stabilization bracket 220 and the first hinge 240 and between the stabilization bracket 220 and the second hinge 260. These bracket adjusters (242A, 242B) allow for the first hinge axis 248 to be moved relative to the roller element 320 and allow for the second hinge axis 268 to be moved relative to the roller element 320.

In FIG. 8 the bracket adjusters 242A and 242B are illustrated with a slot and pin structure such that the hinges 240, 260 may be moved relative to the stabilization bracket 220, and then secured to the stabilization bracket 220 at a selected relative position. For example, fasteners such as screws or bolts may be used to secure the hinges 240, 260 to the stabilization bracket 220. Of course, many other adjustment mechanisms may be used to move the first hinge axis 248 and the second hinge axis 268 relative to the roller element 320.

In some embodiments, it may be desirable to allow a distance between the first hinge axis 248 and the second hinge axis 268 to be adjusted. For example, Referring to FIGS. 1A-1C, the lateral stabilization apparatus 200 may be used with different types of movable partitions 120 or for making fine tuning adjustments so the panels 104 remain parallel to each other such that the lower edges 115 of the opposing sheets of panels are separated from one another by a distance that is the same distance separating the upper portions 170 of the opposing sheets of panels near the track 114. In addition, when a movable partition 120 is configured to follow a curvilinear path, adjusting the roller element 320 to be slightly off-center may assist in controlling lateral displacement of the panels 104 relative to the track 114. FIG. 8 shows the first hinge 240 and hinge 260 attached to the stabilization bracket 220 such that they are slightly offset to the left, making the roller element 320 slightly offset between the first hinge axis 248 and the second hinge axis 268.

Figure 9A:
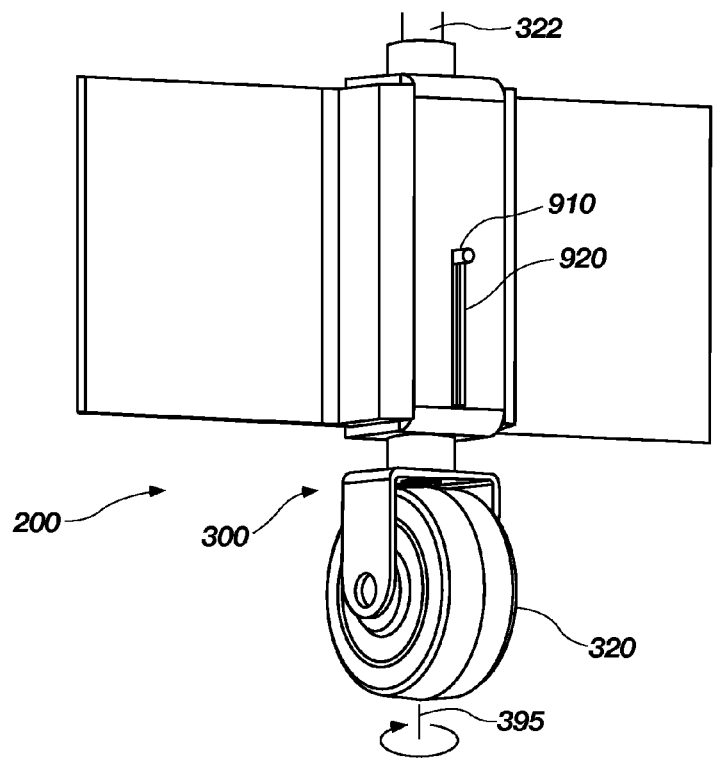
FIGS. 9A and 9B are perspective views of the lateral displacement bracket and roller assembly illustrating a roller pivot control structure in accordance with an embodiment of the present disclosure.
Figure 9B:
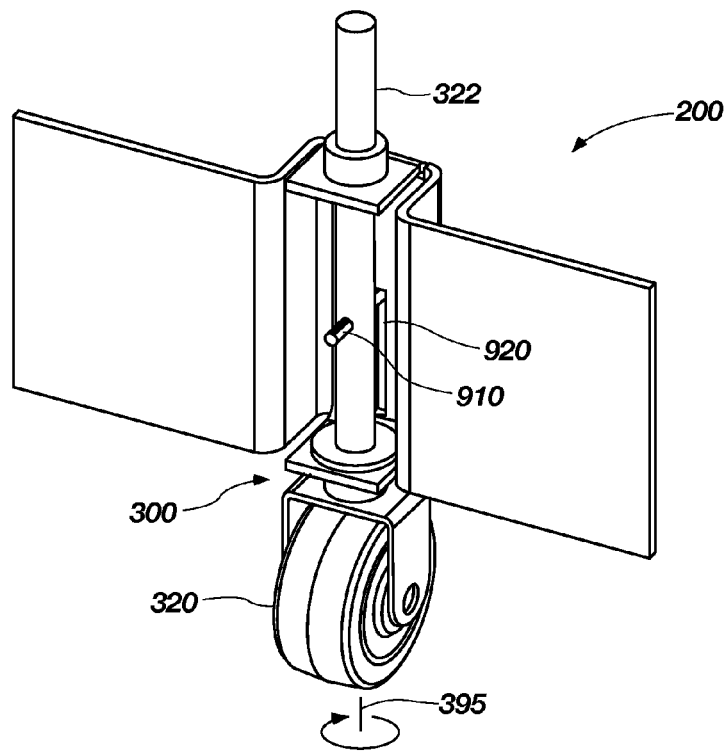

FIGS. 9A and 9B are perspective views of the lateral stabilization apparatus 200 illustrating a roller pivot control structure in accordance with an embodiment of the present disclosure. In this embodiment, the roller pivot control structure includes a retaining pin 910 in a travel slot 920. For clarity, the longitudinal biasing element 360 (FIG. 4) is not illustrated in FIGS. 9A and 9B). As the roller assembly 300 moves along uneven surfaces, as discussed with respect to FIG. 7, the retaining pin 910 may travel up and down the travel slot 920 while still resisting a pivot motion of the roller element 320 about the pivot axis 395. As a non-limiting example, the travel slot 920 may have a height that is about the same distance that the longitudinal biasing element 360 can compress (e.g., roughly 1½ inches for one embodiment).

When the panels 280 and 290 (FIG. 4) traverse a curved path, the outside panels have to travel further than the inside panels. As a result, this difference in travel distance automatically causes the wheel assembly to be steered to the inside of the curve. In other words, the curves traveled by the panels 280 and 290 and directed by the two elongated roller guide members 180 (FIG. 2) help the lateral stabilization apparatus 200 navigate a similar curve even if the roller element 320 is not allowed to pivot. However, in some cases, enabling the roller element 320 to pivot may enable a more true and free traversal of curves for the roller assembly 300. As a non-limiting example, on a small radius (e.g., about 5 feet) curved path, the paired outside panel may get too far ahead of its paired inside panel causing the wheel to over steer to the inside.

To allow for the roller element 320 to pivot somewhat along the pivot axis 395, the travel slot 920 may be widened such that the retaining pin 910 may move side-to-side within the travel slot 920. In other words, the degree the roller element 320 is allowed to pivot becomes a function of the width of the travel slot 920 relative to the diameter of the retaining pin 910. As a non-limiting example, with a ⅛th inch retaining pin 910 the travel slot 920 may be configured with a width of about 0.125 inches for zero turning, about 0.141 inches for an arc of about 5 degrees of turning (i.e., about +/−2.5 degrees) and about 0.158 inches for an arc of about 10 degrees of turning.

In addition, in some embodiments, the tendency of the wheel to roll in a straight line can be enhanced as needed by a horizontal offsetting of the axle of the roller element 320 relative to the wheel assembly shaft 322. In this configuration, wheel assembly shaft 322 tends to pull the roller element 320 along and slightly behind, which keeps the roller element 320 following a straight path.

Figure 10:
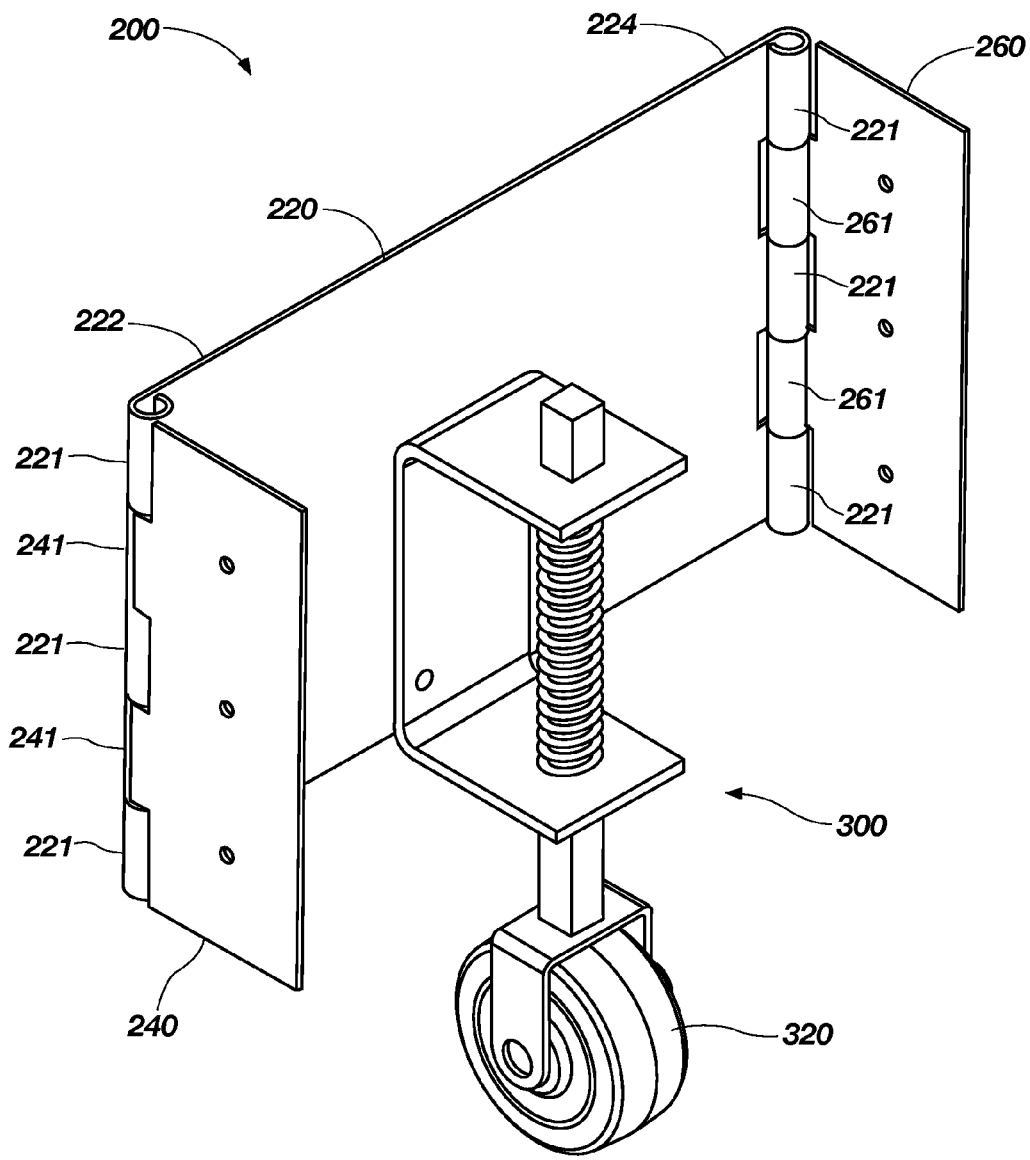
FIG. 10 is a perspective view of another embodiment of the lateral displacement bracket and roller assembly.

FIG. 10 is a perspective view of another embodiment of the lateral stabilization apparatus 200. In this embodiment, the stabilization bracket 220 is formed in a single piece with knuckles 221 on the ends of the first side 222 and the second side 224. These knuckles 221 can receive corresponding knuckles 241 and 261 formed in the first hinge 240 and the hinge 260, respectively, so that when brought together knuckles (241 and 261) interleave with knuckles 221. Hinge pins (not shown) may then be placed through the interleaved knuckles 221, 241, and 261 to hold the three brackets (220, 240, and 260) together.

In yet further embodiments of the disclosure, the lateral displacement apparatus may not include any roller assembly. Example embodiments of such lateral displacement apparatuses are disclosed below.

Figure 11A:
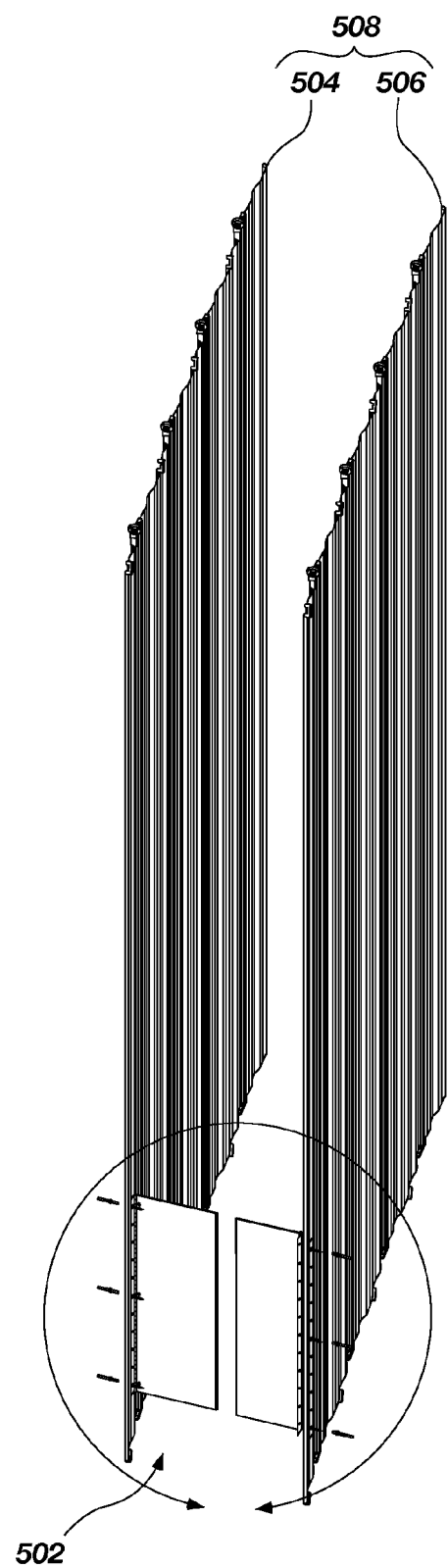
FIG. 11A is a perspective exploded view illustrating another embodiment of a lateral stabilization apparatus to be mounted between two opposing sheets of folding panels of a movable partition.
Figure 11B:
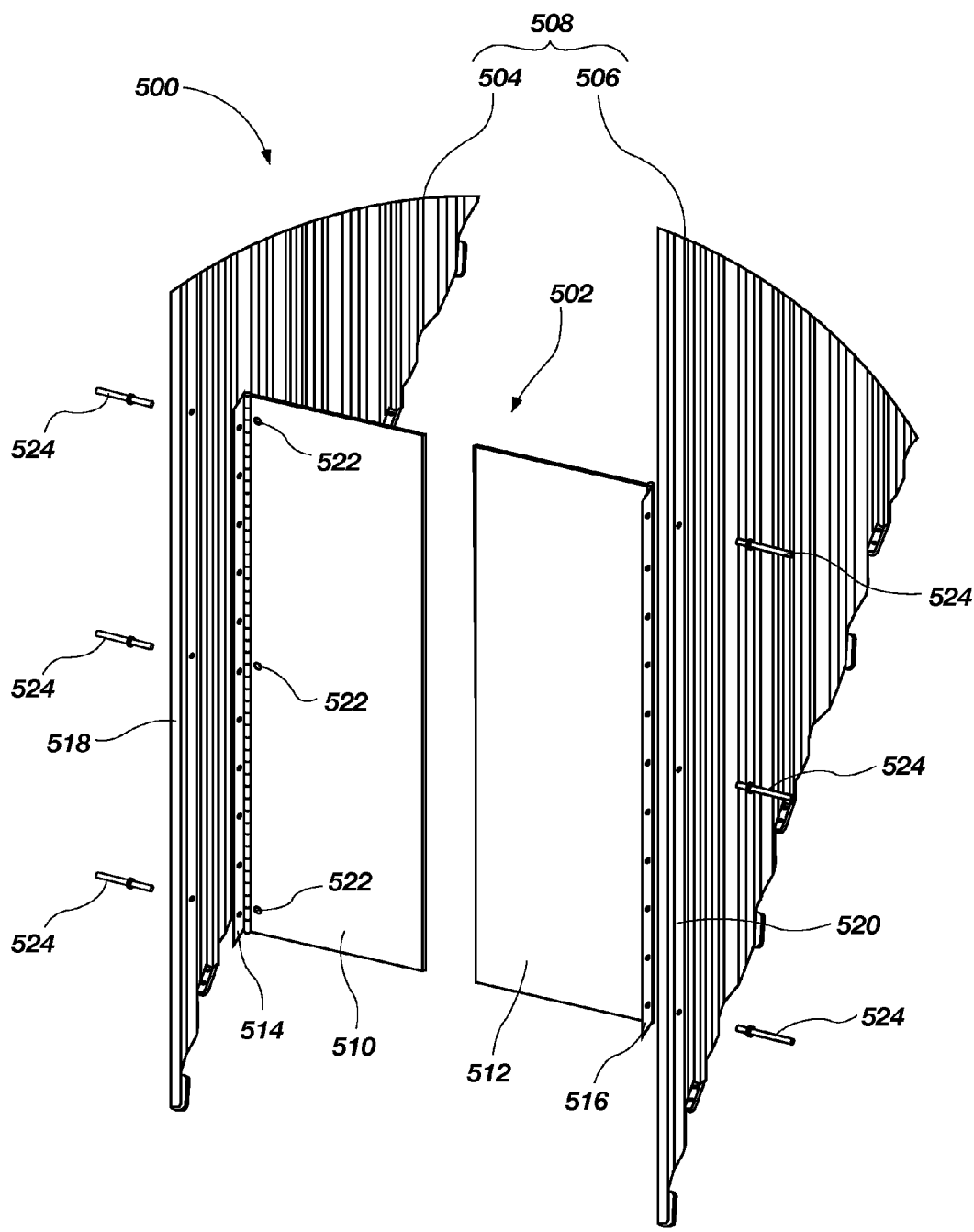
FIG. 11B is an enlarged view of the portion of FIG. 11A including the lateral stabilization apparatus.

FIGS. 11A and 11B are exploded views of a portion of another movable partition system 500 that includes a lateral stabilization apparatus 502 disposed between a first sheet 504 of panels and a second sheet 506 of panels of a movable partition 508, and configured to impart lateral stability to the movable partition 508. The lateral stabilization apparatus 502 of FIGS. 11A and 11B does not include a roller assembly. The movable partition 508 may be at least substantially similar to the movable partition 120 previously described herein. Thus, the first sheet 504 of panels and the second sheet 506 of panels are disposed side-by-side one another, and each of the first sheet 504 of panels and the second sheet 506 of panels may comprise a plurality of panels coupled to one another in a manner allowing adjacent panels to pivot relative to one another as the movable partition 508 is extended and retracted.

One or more lateral displacement apparatuses 502 may be disposed between the first sheet 504 of panels and the second sheet 506 of panels. Each of the lateral displacement apparatuses 502 may be installed proximate the lower edges of the sheets 504, 506 of panels. Each of the lateral displacement apparatuses 502 includes one or more stabilization brackets. For example, the embodiment shown in FIGS. 11A and 11B includes a first stabilization bracket 510 and a second stabilization bracket 512. A first hinge 514 couples the stabilization brackets 510, 512 to a first panel 518 of the first sheet 504 of panels, and a second hinge 516 couples the stabilization brackets 510, 512 to a second panel 520 of the second sheet 506 of panels. As in the previously described embodiments, a hinge axis of the first hinge 514 may be at least substantially vertically oriented, and a hinge axis of the second hinge 516 may be at least substantially vertically oriented. Each of the panels 518, 520 may comprise two opposing relatively longer end surfaces, two opposing relatively shorter end surfaces, and two opposing major side surfaces each extending between the two opposing longer end surfaces and the two opposing shorter end surfaces.

Figure 13A:
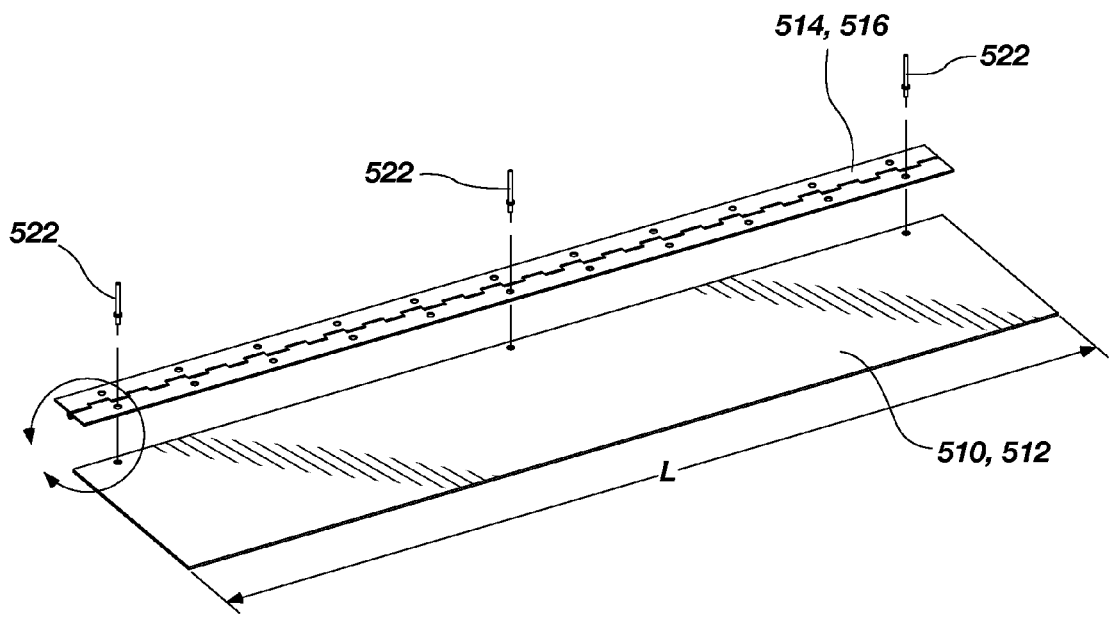
FIG. 13A is an exploded perspective view illustrating how a hinge of the lateral stabilization apparatus of FIGS. 11A and 11B and FIGS. 12A and 12B may be attached to a lateral displacement bracket.
Figure 13B:
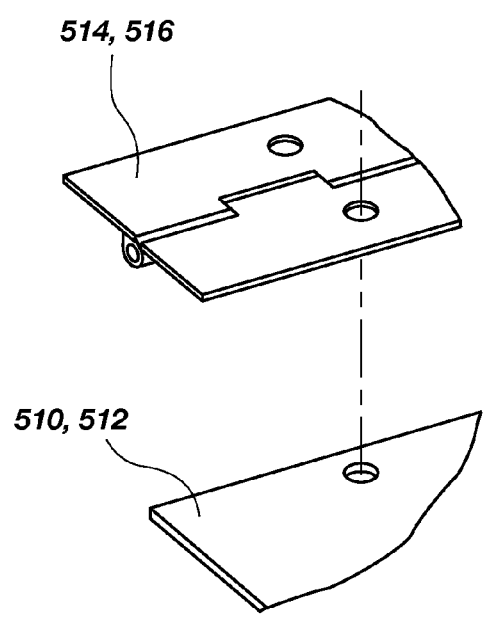
FIG. 13B is an enlarged view of a portion of FIG. 13A.

As shown in FIG. 11B, the first stabilization bracket 510 may be attached to the first hinge 514, and the second stabilization bracket 512 may be attached to the second hinge 516. In some embodiments, the first stabilization bracket 510 may comprise an integral portion of the first hinge 514, and the second stabilization bracket 512 may comprise an integral portion of the second hinge 516. As shown in FIGS. 13A and 13B, in other embodiments, each of the first stabilization bracket 510 and the second stabilization bracket 512 may comprise separate members that are attached respectively to the first hinge 514 and the second hinge 516 using one or more fasteners 522. The fasteners 522 may comprise, for example, bolts, screws, or rivets.

Referring again to FIG. 11B, the first hinge 514 and the second hinge 516 may be respectively attached to the first panel 518 and the second panel 520 using fasteners 524, which also may comprise, for example, bolts, screws, or rivets.

In some embodiments, each of the first stabilization bracket 510 and the second stabilization bracket 512 may be at least substantially planar. The first stabilization bracket 510 may be attached to the second stabilization bracket 512 using one or more fasteners 526, which also may comprise, for example, bolts, screws, or rivets. In some embodiments, the fasteners 526 may comprise self-tapping screws, thereby allowing the first stabilization bracket 510 and the second stabilization bracket 512 to be positioned relative to one another at desirable locations, and then simply screwed together with the self-tapping screws at any desirable location.

Figure 12A:
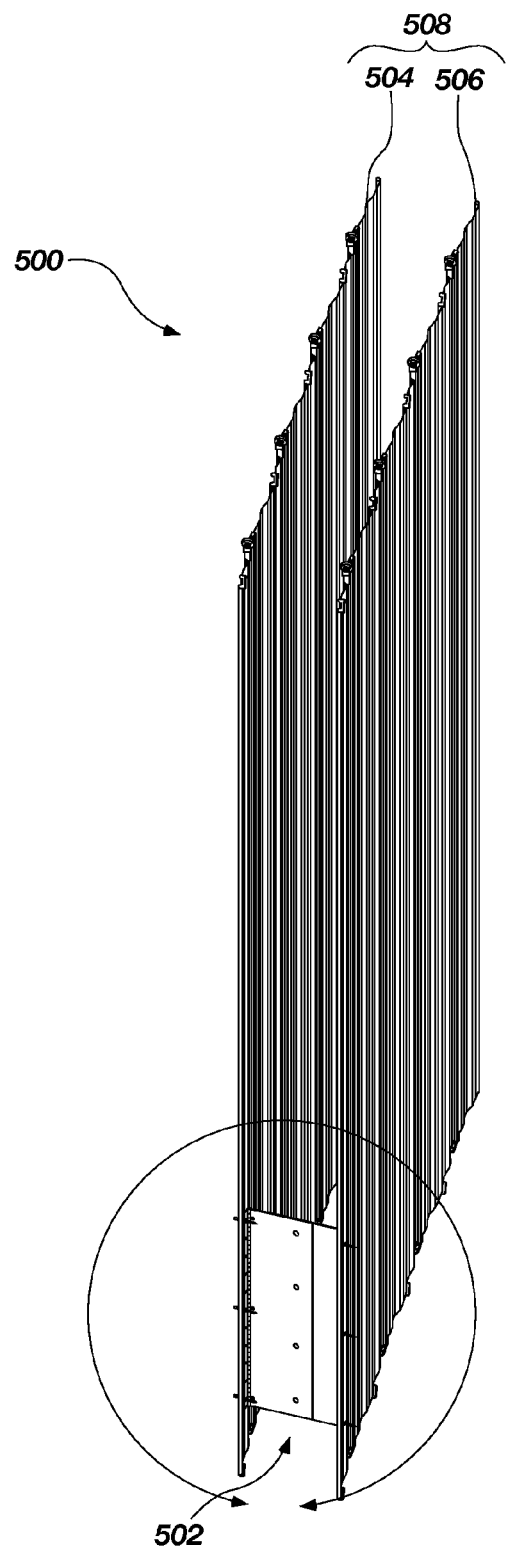
FIG. 12A is a perspective view of the lateral stabilization apparatus of FIGS. 11A and 11B mounted between two opposing sheets of folding panels of a movable partition.
Figure 12B:
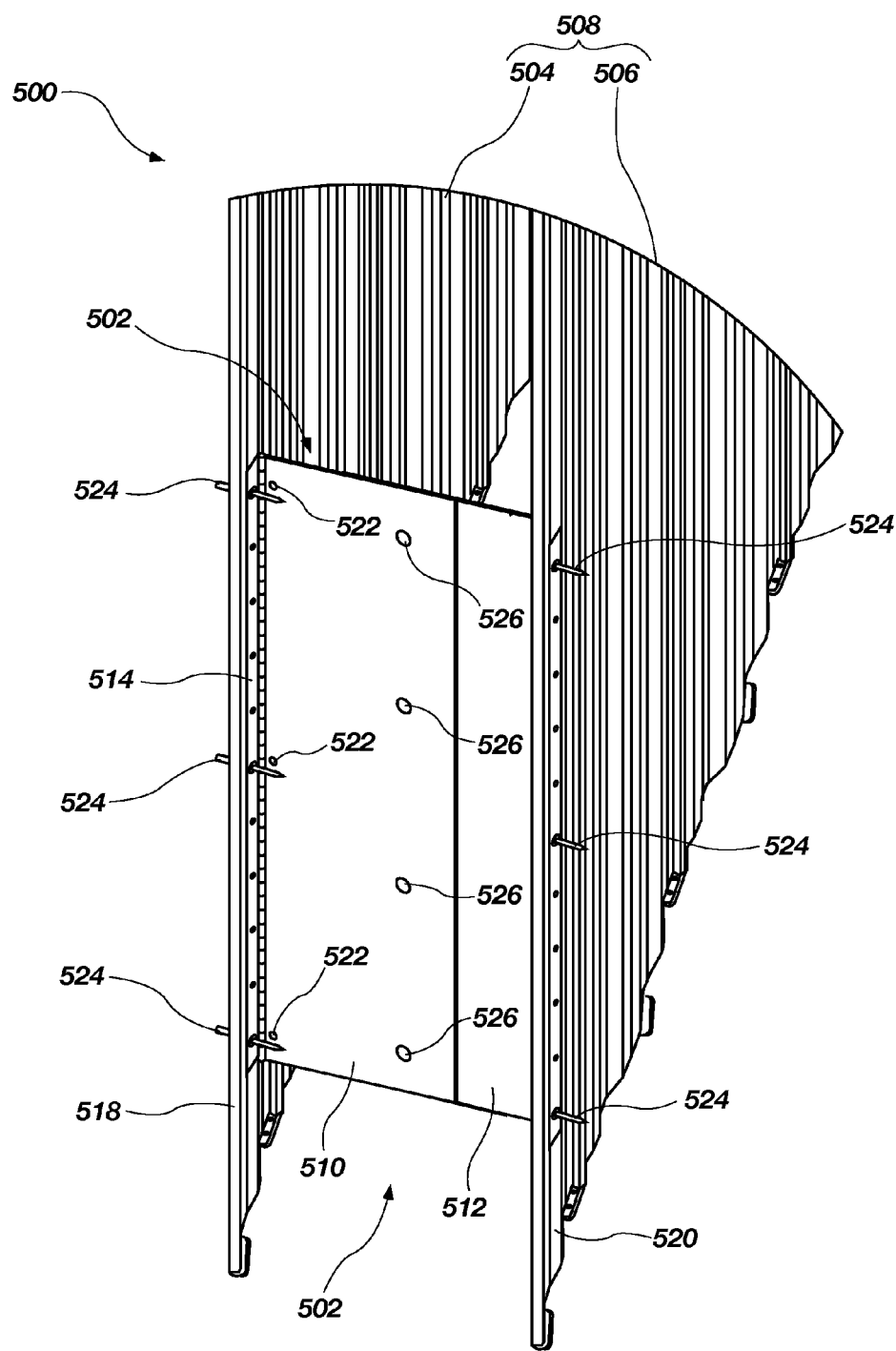
FIG. 12B is an enlarged view of the portion of FIG. 12A including the lateral stabilization apparatus.

FIGS. 12A and 12B illustrate the lateral stabilization apparatus in an assembled state. The first hinge 514 may be mounted to directly to the first panel 518 proximate a vertical centerline of the first panel 518, and the second hinge 516 may be mounted directly to the second panel 520 proximate a vertical centerline of the second panel 520, in a manner like that previously described with reference to FIGS. 4 and 5. Thus, the hinge axis of the first hinge 514 may be at least substantially aligned with the vertical centerline of the first panel 518, and the hinge axis of the second hinge 516 may be at least substantially aligned with the vertical centerline of the second panel 520. As a non-limiting example, the hinge axis of the first hinge 514 may be located within about one quarter of an inch (0.250 in.) of the vertical centerline of the first panel 518, and the hinge axis of the second hinge 516 may be located within about one quarter of an inch (0.250 in.) of the vertical centerline of the second panel 520.

The first hinge 514 may be attached to only one panel of the first sheet 504 of panels (e.g., the first panel 518) and may not interconnect any two panels in the first sheet 504 of panels. Similarly, the second hinge 516 may be attached to only one panel of the second sheet 506 of panels (e.g., the first panel 520) and may not interconnect any two panels in the second sheet 506 of panels.

Figure 14:
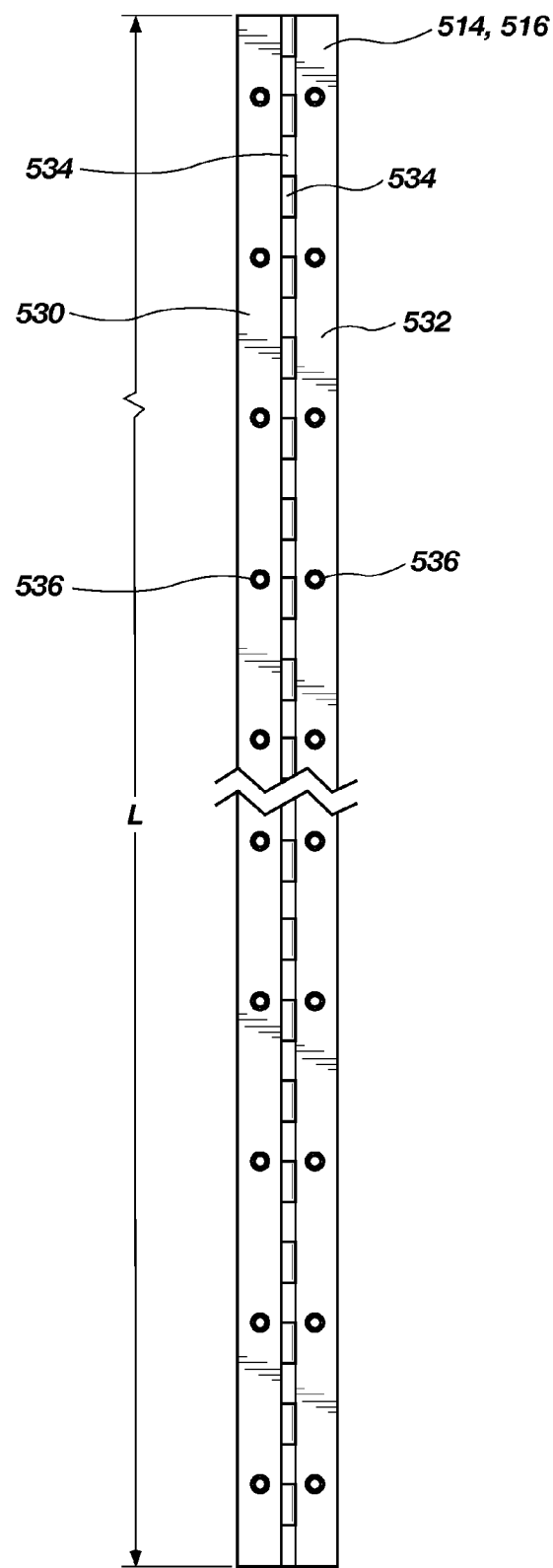
FIG. 14 is a plan view of a hinge of the lateral stabilization apparatus of FIGS. 11A and 11B and FIGS. 12A and 12B.

As previously mentioned, the lateral displacement apparatus 500 may not include any roller assembly in some embodiments. Thus, to impart more lateral stability to the movable partition 508 in the absence of any roller assembly, the length of the hinges 514, 516, and the stabilization brackets 510, 512 may be increased. FIG. 14 is a plan view of the first hinge 514, although the second hinge 516 may be identical to the first hinge 514 in some embodiments. The hinges 514, 516 may have a piano hinge configuration, and may include a first portion 530 and a second portion 532, each of which have features 534 defining cylindrical receptacles which may be assembled together with one or more pin members (not shown) inserted into the cylindrical receptacles to join the first portion 530 and the second portion 532 together. Additionally, each portion 530, 532 of the hinges 514, 516 may include pre-drilled holes 536 extending there through for receiving the fasteners 522, 524.

As shown in FIGS. 13A and 14, the first hinges 514, 516 and the stabilization brackets 510, 512 may have a length L, which, when installed on a movable partition 508 within a building, may be oriented vertically. In some embodiments, the length L of the hinges 514, 516 and/or the stabilization brackets 510, 512 may be about ten inches (10 in.) or more, about fifteen inches (15 in.) or more, or even about twenty inches (20 in.) or more (e.g., about twenty-two inches (22 in.) or more).

Although not shown in the figures, the movable partition system 500 may comprise a drive 122, which may include a motor 124 and a belt or chain 125, for automatically moving the movable partition 508 as previously described in relation to FIG. 1C.

Referring again to FIGS. 11A and 11B, to install the lateral displacement apparatus 500 between the first sheet 504 of panels and the second sheet 506 of panels, the first hinge 514 may be attached to the first panel 518 of the first sheet 504 of panels using fasteners 524, and may be oriented such that the hinge axis of the first hinge 514 extends generally along the vertical centerline of the first panel 518. Similarly, the second hinge 516 may be attached to the second panel 520 of the second sheet 506 of panels using fasteners 524, and may be oriented such that the hinge axis of the second hinge 516 extends generally along the vertical centerline of the second panel 520.

At least one stabilization bracket 510, 512 may be coupled between the first hinge 514 and the second hinge 516. For example, the first stabilization bracket 510 may be coupled to the first hinge 514 (before or after attaching the first hinge 514 to the first panel 518), and the second stabilization bracket 512 may be coupled to the second hinge 516 (before or after attaching the second hinge 516 to the second panel 520). Fasteners 522 may be employed to fasten the stabilization brackets 510, 512 to the hinges 514, 516 as previously described.

The first stabilization bracket 510 may be coupled to the second stabilization bracket 512. In some embodiments, the first stabilization bracket 510 may be coupled to the second stabilization bracket 512 after attaching the stabilization brackets 510, 512 to the hinges 514, 516, and after attaching the hinges 514, 516 to the panels 518, 520.

As previously mentioned, each of the panels 518, 520 may comprise two opposing relatively longer end surfaces, two opposing relatively shorter end surfaces, and two opposing major side surfaces each extending between the two opposing longer end surfaces and the two opposing shorter end surfaces. The hinges 514, 516 may be respectively attached directly to one of the opposing major side surfaces of the panels 518, 520. The first hinge 514 may be mounted directly to the first panel 518 proximate a vertical centerline of the first panel 518, and the second hinge 516 may be mounted directly to the second panel 520 proximate a vertical centerline of the second panel 520. Thus, the hinge axis of the first hinge 514 may be at least substantially aligned with the vertical centerline of the first panel 518, and the hinge axis of the second hinge 516 may be at least substantially aligned with the vertical centerline of the second panel 520. As a non-limiting example, the hinge axis of the first hinge 514 may be located within about one quarter of an inch of the vertical centerline of the first panel 518, and the hinge axis of the second hinge 516 may be located within about one quarter of an inch of the vertical centerline of the second panel 520.

In the embodiments disclosed herein, multiple lateral stabilization apparatuses may be employed at different locations along a movable partition of a movable partition system.

While the invention may be susceptible to various modifications and alternative forms, specific embodiments have been shown by way of example in the drawings and have been described in detail herein. However, it should be understood that the invention is not intended to be limited to the particular forms disclosed. It is also noted that various features of any of the described embodiments may be combined with features of other described embodiments as will be apparent to those of ordinary skill in the art. The invention, therefore, includes all modifications, equivalents, and alternatives falling within the spirit and scope of the invention as defined by the following appended claims.

What is claimed is:

1. A movable partition system, comprising:
   a movable partition, comprising:
      a first sheet of panels; and
      a second sheet of panels located beside the first sheet of panels;
      wherein each of the first sheet of panels and the second sheet of panels comprises a plurality of panels coupled to one another in a manner allowing adjacent panels of the plurality of panels to pivot relative to one another; and
   at least one lateral stabilization apparatus disposed between the first sheet of panels and the second sheet of panels and configured to impart lateral stability to the movable partition, the at least one apparatus comprising:
      at least one stabilization bracket;
      a first hinge coupling the at least one stabilization bracket to a first panel of the plurality of panels of the first sheet of panels, a hinge axis of the first hinge being at least substantially vertically oriented proximate a vertical centerline on the first panel between first and second pivotable couplings of the first panel, about which vertical centerline the first panel of the plurality of panels rotates as the movable partition is moved from an open position to a closed position and from the closed position to the open position; and a second hinge coupling the at least one stabilization bracket to a second panel of the plurality of panels of the second sheet of panels, a hinge axis of the second hinge being at least substantially vertically oriented proximate a vertical centerline on the second panel between first and second pivotable couplings of the second panel, about which vertical centerline the second panel of the plurality of panels rotates as the movable partition is moved from the open position to the closed position and from the closed position to the open position.

2. The movable partition system of claim 1, wherein the at least one stabilization bracket comprises:
a first stabilization bracket attached to the first hinge; and
a second stabilization bracket attached to the second hinge and to the first stabilization bracket.

3. The movable partition system of claim 2, wherein at least one of the first stabilization bracket and the second stabilization bracket is at least substantially planar.

4. The movable partition system of claim 3, wherein each of the first stabilization bracket and the second stabilization bracket is at least substantially planar.

5. The movable partition system of claim 2, wherein the second stabilization bracket is attached to the first stabilization bracket by one or more fasteners.

6. The movable partition system of claim 5, wherein the one or more fasteners comprise a self-tapping screw.

7. The movable partition system of claim 2, wherein the first bracket is coupled to the first hinge with one or more fasteners.

8. The movable partition system of claim 7, wherein the second bracket is coupled to the second hinge with one or more fasteners.

9. The movable partition system of claim 1, further comprising a motor configured to drive movement of the movable partition along a pathway.

10. The movable partition system of claim 1, wherein the first hinge is mounted directly to the first panel proximate a vertical centerline substantially equidistant the first and second pivotable couplings of the first panel.

11. The movable partition system of claim 10, wherein the second hinge is mounted directly to the second panel proximate a vertical centerline substantially equidistant the first and second pivotable couplings of the second panel.

12. The movable partition system of claim 11, wherein the hinge axis of the first hinge is at least substantially aligned with the vertical centerline of the first panel.

13. The movable partition system of claim 12, wherein the hinge axis of the second hinge is at least substantially aligned with the vertical centerline of the second panel.

14. The movable partition system of claim 13, wherein the hinge axis of the first hinge is located within about one quarter of an inch of the vertical centerline of the first panel.

15. The movable partition system of claim 14, wherein the hinge axis of the second hinge is located within about one quarter of an inch of the vertical centerline of the second panel.

16. The movable partition system of claim 1, wherein the first hinge does not interconnect any two panels of the entire plurality of panels of the first sheet of panels, and wherein the second hinge does not interconnect any two panels of the entire plurality of panels of the second sheet of panels.

17. The movable partition system of claim 1, further comprising a roller assembly coupled to the at least one stabilization bracket and comprising at least one roller located and configured to contact and roll along a floor surface as the movable partition moves along a pathway.

18. A method of installing a movable partition system within a building, comprising:
providing a movable partition including a first sheet of panels and a second sheet of panels, each of the first sheet of panels and the second sheet of panels comprising a plurality of panels coupled to one another in a manner allowing adjacent panels of the plurality of panels to pivot relative to one another; and
installing at least one lateral stabilization apparatus on the movable partition between the first sheet of panels and the second sheet of panels, comprising:
attaching a first hinge to a first panel of the plurality of panels of the first sheet of panels and orienting a hinge axis of the first hinge generally along a vertical centerline of the first panel substantially equidistant first and second pivotable couplings of the first panel, about which vertical centerline the first panel rotates as the movable partition is moved from an open position to a closed position and from the closed position to the open position;
attaching a second hinge to a second panel of the plurality of panels of the second sheet of panels and orienting a hinge axis of the second hinge generally along a vertical centerline of the second panel substantially equidistant first and second pivotable couplings of the second panel, about which vertical centerline the second panel rotates as the movable partition is moved from the open position to the closed position and from the closed position to the open position; and
coupling at least one stabilization bracket between the first hinge and the second hinge.

19. The method of claim 18, wherein coupling the at least one stabilization bracket between the first hinge and the second hinge comprises:
attaching a first stabilization bracket attached to the first hinge;
attaching a second stabilization bracket to the second hinge; and
attaching the first stabilization bracket to the second stabilization bracket.

20. The method of claim 19, further comprising attaching the first stabilization bracket to the second stabilization bracket after each of attaching the first hinge to the first panel, attaching the second hinge to the second panel, attaching the first stabilization bracket to the first hinge, and attaching the second stabilization bracket to the second hinge.

21. The method of claim 20, further comprising attaching the first stabilization bracket to the second stabilization bracket using one or more fasteners selected from the group consisting of screws, bolts, and rivets.

22. The method of claim 19, wherein the first bracket is coupled to the first hinge with one or more fasteners.

23. The method of claim 18, wherein each panel of the plurality of panels of the first sheet of panels and the plurality of panels of the second sheet of panels is elongated and comprises:
two opposing relatively longer end surfaces;
two opposing relatively shorter end surfaces; and two opposing major side surfaces each extending between the two opposing longer end surfaces and the two opposing shorter end surfaces.

24. The method of claim 18, wherein attaching the first hinge to the first panel comprises attaching the first hinge directly to one of the two opposing major side surfaces of the first panel, and wherein attaching the second hinge to the second panel comprises attaching the second hinge directly to one of the two opposing major side surfaces of the second panel.

25. The method of claim 24, further comprising mounting the first hinge to the first panel proximate a vertical centerline of the first panel.

26. The method of claim 25, further comprising mounting the second hinge to the second panel proximate a vertical centerline of the second panel.

27. The method of claim 26, further comprising at least substantially aligning the hinge axis of the first hinge with the vertical centerline of the first panel.

28. The method of claim 27, further comprising at least substantially aligning the hinge axis of the second hinge with the vertical centerline of the second panel.

29. The method of claim 28, further comprising locating the hinge axis of the first hinge within about one quarter of an inch of the vertical centerline of the first panel.

30. The method of claim 29, further comprising locating the hinge axis of the second hinge within about one quarter of an inch of the vertical centerline of the second panel.

31. The method of claim 18, further comprising coupling a roller assembly to the at least one stabilization bracket and configuring a roller of the roller assembly to contact and roll along a floor surface as the movable partition moves along a pathway.

\* \* \* \* \*